(12) United States Patent
Lee et al.

(10) Patent No.: US 10,908,722 B2
(45) Date of Patent: Feb. 2, 2021

(54) SENSING DEVICE AND DISPLAY DEVICE

(71) Applicant: LG Display Co., Ltd., Seoul (KR)

(72) Inventors: YoungJang Lee, Seoul (KR); JunHo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/514,703

(22) Filed: Jul. 17, 2019

(65) Prior Publication Data
US 2020/0167026 A1 May 28, 2020

(30) Foreign Application Priority Data
Nov. 23, 2018 (KR) .................. 10-2018-0146369

(51) Int. Cl.
| | |
|---|---|
| G06F 3/041 | (2006.01) |
| G06K 9/00 | (2006.01) |
| G02F 1/1333 | (2006.01) |
| G06F 3/044 | (2006.01) |
| G01S 15/42 | (2006.01) |
| G01H 11/06 | (2006.01) |
| H01L 27/12 | (2006.01) |
| H03F 3/08 | (2006.01) |
| G09G 3/34 | (2006.01) |
| H01L 27/146 | (2006.01) |

(Continued)

(52) U.S. Cl.
CPC ............ G06F 3/0412 (2013.01); G06F 3/044 (2013.01); G06F 3/0414 (2013.01); G06K 9/0002 (2013.01); *G02F 2001/133394* (2013.01)

(58) Field of Classification Search
CPC ........ G06F 3/0412–044; G06K 9/0002; G02F 2001/133394; G01S 7/521
See application file for complete search history.

(56) References Cited

U.S. PATENT DOCUMENTS 6,633,287 B1 * 10/2003 Yatabe .................. G09G 3/367
315/169.3
8,629,726 B1 * 1/2014 Madison ............. H03F 3/45183
330/308

(Continued)

FOREIGN PATENT DOCUMENTS

| CN | 108287636 A | * 11/2018 | ........... G06F 3/0412 |
|---|---|---|---|
| CN | 108845323 A | * 11/2018 | ............. G01S 15/42 |
| CN | 205092962 U | * 11/2018 | ............. G01H 11/06 |

*Primary Examiner* — Lin Li
(74) *Attorney, Agent, or Firm* — Fenwick & West LLP

(57) ABSTRACT

The present disclosure relates to a sensing device and a display device including the sensing device. The sensing device includes a transducer including first and second driving electrodes and a piezoelectric material layer; first and second transmission transistors for alternatively supplying first and second driving voltages to the first driving electrode; and first and second reception transistors electrically connected between a readout line and a power supply line to which a power supply voltage is supplied. During an interval in which at least one pixel is driven, the first and second driving voltages are DC voltages with a voltage level different from each other, and the first and second transmission transistors repeat turn-on and turn-off at a timing different from each other. Through this, it is possible to reduce unnecessary power consumption, and therefore, a large area fingerprint sensor can be more efficiently implemented.

23 Claims, 27 Drawing Sheets

(51) Int. Cl.
    *G02F 1/1335*  (2006.01)
    *G09G 3/36*    (2006.01)

(56)            References Cited

U.S. PATENT DOCUMENTS 10,651,203 B2 *   5/2020  Kaneyasu .............. G06F 3/042
2009/0146967 A1 *   6/2009  Ino ..................... G06F 3/0412
                                                      345/173
2010/0156847 A1 *   6/2010  No ..................... G06F 3/04164
                                                      345/175
2013/0082936 A1 *   4/2013  Islamkulov ....... H01L 27/14609
                                                      345/173
2013/0321366 A1 * 12/2013  Kozuma ............... G06F 3/0421
                                                      345/204
2015/0310793 A1 * 10/2015  Kawashima ......... G09G 3/3233
                                                      345/174
2017/0090028 A1 *   3/2017  Djordjev ................ G01S 7/521
2018/0143725 A1 *   5/2018  Nathan ................ G06F 3/0414

* cited by examiner

FIG.23
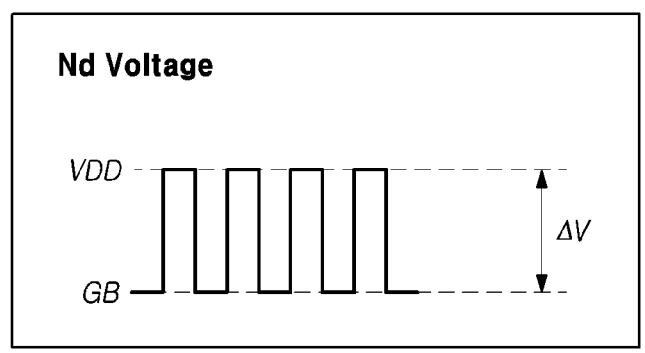
=
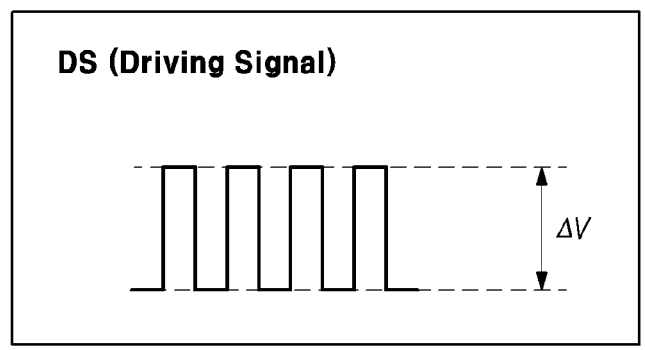

*FIG.26*

| D-PNL |
|---|
| S-PNL |

SENSING DEVICE AND DISPLAY DEVICE

CROSS-REFERENCE TO RELATED APPLICATION

This application claims the priority benefit of Korean Patent Application No. 10-2018-0146369, filed on Nov. 23, 2018 in the Korean Intellectual Property Office, the disclosure of which is incorporated herein by reference in its entirety.

BACKGROUND

Field of the Disclosure

The present disclosure relates to sensing devices and display devices.

Description of the Background

As the information society has developed at a rapid rate, there is an increasing need for display devices employing advanced technologies and more efficient methods. Recently, various types of display devices, such as Liquid Crystal Display (LCD), Plasma Display Panel (PDP), and Organic Light Emitting Display (OLED) devices, have been developed and utilized.

In addition, in order to provide various applications and services to a user, a display device provides various application functions based on results obtained by sensing the touch of a user or sensing biometric information of the user, such as a fingerprint, or the like.

Thus, the display device includes a sensing device for sensing biometric information, such as a touch, a fingerprint, or the like. Application technologies (e.g., user authentication, financial transactions, etc.) using sensing results from the display device may desire that sensing results from sensing devices have high accuracy or sensing operations of the sensing devices have high security. However, typical sensing devices are not satisfactory in sensing accuracy and security.

In addition, it may be desirable for a sensing device to be capable of sensing a large area or be downsized; however, it is not easy for typical sensing devices to be downsized due to a light source, and relevant components etc., or to perform large area sensing.

SUMMARY

Accordingly, the present disclosure is directed to a sensing device and a display device including the sensing device that substantially obviate one or more problems due to limitations and disadvantages of the prior art. Additional features and advantages of the disclosure will be set forth in the description which follows and in part will be apparent from the description, or may be learned by practice of the disclosure. The objects and other advantages of the disclosure will be realized and attained by the structure particularly pointed out in the written description and claims hereof as well as the appended drawings. It is an object of the present disclosure to provide a sensing device having high sensing accuracy and high security and a display device including the sensing device.

It is another object of the present disclosure to provide a sensing device having a pixel structure advantageous for downsizing the sensing device and a display device including the sensing device.

It is further another object of the present disclosure to provide a sensing device having a pixel structure advantageous for implementing a large area sensor and a display device including the sensing device.

It is still another object of the present disclosure to provide a sensing device capable of reducing power consumption when sensing operation is performed and a display device including the sensing device.

It is yet another object of the present disclosure to provide a sensing device that is not affected by a delay of a signal used for driving when sensing operation is performed and a display device including the sensing device.

In accordance with one aspect of the present disclosure, a sensing device is provided that includes: a sensing panel including a plurality of pixels, and a sensing circuit driving one or more first pixels selected from the plurality of pixels, and detecting a sensing signal from one or more second pixels adjacent to the one or more first pixels.

Each of the plurality of pixels can include: a transducer including a first driving electrode, a piezoelectric material layer, and a second driving electrode, a first transmission transistor and a second transmission transistor electrically connected between a driving line to which a first driving voltage is supplied and the second driving electrode to which a second driving voltage is supplied, and a first reception transistor and a second reception transistor electrically connected between a readout line and a power supply line to which a power supply voltage is supplied.

The first transmission transistor can be electrically connected between the driving line and a connection node to which the first transmission transistor and the second transmission transistor are electrically connected.

The second transmission transistor can be electrically connected between the connection node and the second driving electrode.

The first reception transistor can be electrically connected between the power supply line and an intermediate node to which the first reception transmission transistor and the second reception transmission transistor are electrically connected.

The second reception transistor can be controlled by a received scan signal, and be electrically connected between the intermediate node and the readout line.

The first driving voltage and the second driving voltage can be DC voltages each having a different level from the other.

During an interval in which a first pixel is driven, in the first pixel, a first transmission transistor can repeat turn-on and turn-off, and a second transmission transistor can repeat turn-on and turn-off opposite to those of the first transmission transistor.

The driving of the first pixel may mean that the first pixel is operated in a driving mode and the first pixel is a driving pixel.

When the first pixel is driven, a transducer included in the first pixel can generate a signal. For example, signals from the transducer may be ultrasonic waves, or the like.

Ultrasonic waves generated by the first pixel are reflected from the fingerprint of a finger. The ultrasonic waves reflected from the fingerprint are received to a transducer included in a second pixel adjacent to the first pixel, resulting in an electrical signal being generated.

During an interval in which the first pixel is driven, a level of a voltage in a first driving electrode of the transducer included in the first pixel can swing between a first driving voltage and a second driving voltage.

During an interval in which the first pixel is driven, a speed at which the voltage level of the first driving electrode of the transducer swings can correspond to a speed at which the first and second transmission transistors included in the first pixel are alternately turned on.

In accordance with another aspect of the present disclosure, a display device is provided that includes: a display panel, a sensing pixel including a plurality of pixels, a display driving circuit driving the display panel, and a sensing circuit driving and sensing the sensing panel Each of the plurality of pixels disposed in the sensing panel can include: a transducer including a first driving electrode, a piezoelectric material layer, and a second driving electrode, a first transmission transistor and a second transmission transistor electrically connected between a driving line to which a first driving voltage is supplied and the second driving electrode to which a second driving voltage is supplied, and a first reception transistor and a second reception transistor electrically connected between a readout line and a power supply line to which a power supply voltage is supplied.

The first transmission transistor can be electrically connected between the driving line and a connection node to which the first transmission transistor and the second transmission transistor are electrically connected.

The second transmission transistor can be electrically connected between the connection node and the second driving electrode.

The first reception transistor can be electrically connected between the power supply line and an intermediate node to which the first reception transmission transistor and the second reception transmission transistor are electrically connected.

The second reception transistor can be controlled by a received scan signal, and be electrically connected between the intermediate node and the readout line.

The first driving voltage and the second driving voltage can be DC voltages each having a different level from the other.

During an interval in which a first pixel is driven, in the first pixel, a first transmission transistor can repeat turn-on and turn-off, and a second transmission transistor can repeat turn-on and turn-off opposite to those of the first transmission transistor.

During an interval in which the first pixel is driven, a level of a voltage in a first driving electrode of a transducer included in the first pixel can swing between a first driving voltage and a second driving voltage.

Both the first transmission transistor and the second transmission transistor may be n-type transistors or p-type transistors.

A gate node of each of the first transmission transistor and the second transmission transistor can be electrically connected to a different scan node from each other.

One of the first transmission transistor and the second transmission transistor may be an n-type transistor, and the other may be a p-type transistor.

A gate node of each of the first transmission transistor and the second transmission transistor can be electrically connected to a same scan line.

A mode control transistor can be electrically connected between a connection node to which the first transmission transistor and the second transmission transistor are connected and the first driving electrode.

The mode control transistor can remain turned on while the first transmission transistor and the second transmission transistor are alternately turned on.

The mode control transistor is turned off while only one of the first transmission transistor and the second transmission transistor remains turned on.

The display device can sense a touch or a fingerprint on the display panel based on data obtained by sensing the sensing panel.

In accordance with one aspect of the present disclosure, an apparatus includes a sensing panel and a sensing circuit for driving and sensing the sensing panel. The sensing panel includes a plurality of pixels. At least one pixel of the pixels includes a transducer and a first transmission transistor. The transducer includes a first driving electrode, a piezoelectric material layer, and a second driving electrode. The first transmission transistor is connected between a driving line and the first driving electrode of the transducer. The driving line is supplied a first driving voltage that is a DC voltage. During operation of the at least one pixel in a driving mode, the sensing circuit provides a first driving signal that is an AC signal to a gate of the first transmission transistor.

A second transmission transistor may be connected in series with the first transmission transistor and connected between the first transmission transistor and the second driving electrode. The second driving electrode may be supplied with a second driving voltage that is a DC voltage having a different level than the first driving voltage.

During the operation of the at least one pixel in the driving mode, the sensing circuit may supply a second driving signal to a gate of the second transmission transistor, the second driving signal being an AC signal that is opposite in phase to the first driving signal.

A mode control transistor may be connected between the first driving electrode and a node between the first and second transmission transistors. During the operation of the at least one pixel in the driving mode: the sensing circuit may provide the first driving signal to a gate of the second transmission transistor, and the sensing circuit may provide a control signal to a gate of the mode control transistor to drive the first driving electrode with a voltage at the node between the first and second transmission transistors which swings between the first driving voltage and the second driving voltage. During operation of the at least one pixel in a sensing mode: the sensing circuit may provide a control signal to a gate of the mode control transistor to electrically disconnect the first driving electrode and the node between the first and second transmission transistors.

In accordance with embodiments of the present disclosure, it is possible to provide a sensing device having high sensing accuracy and high security and a display device including the sensing device.

In accordance with embodiments of the present disclosure, it is possible to provide a sensing device having a pixel structure advantageous for downsizing the sensing device and a display device including the sensing device.

In accordance with embodiments of the present disclosure, it is possible to provide a sensing device having a pixel structure advantageous for implementing a large area sensor and a display device including the sensing device.

In accordance with embodiments of the present disclosure, it is possible to provide a sensing device capable of reducing power consumption when sensing operation is performed and a display device including the sensing device.

In accordance with embodiments of the present disclosure, it is possible to provide a sensing device that is not affected by a delay of a signal used for driving when sensing operation is performed and a display device including the sensing device.

BRIEF DESCRIPTION OF THE DRAWINGS

FIG. 15 is applied in the sensing device, a signal system for operating the sensing device according to embodiments of the present disclosure.

FIG. 15 is applied in the sensing device, during a first interval and a second interval, the scanning and the driving timing of a first pixel, a second pixel and a third pixel, according to embodiments of the present disclosure.

FIG. 23 illustrates, when a pixel of the sensing device includes two transmission transistors in a transmission portion, a voltage formed in a first driving electrode of a transducer according to embodiments of the present disclosure.

FIG. 26 illustrates a sensing panel located outside of a display panel in the display device according to embodiments of the present disclosure.

DETAILED DESCRIPTION

Figure 1:
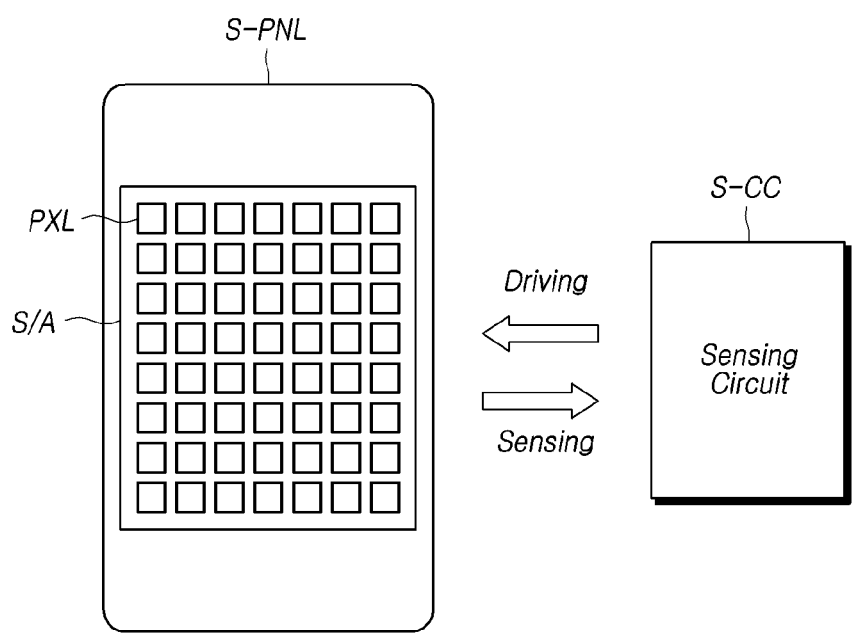
FIG. 1 is a diagram schematically illustrating a sensing device according to embodiments of the present disclosure.

The advantages and features of the present disclosure and methods of achieving the same will be apparent by referring to aspects of the present disclosure as described below in detail in conjunction with the accompanying drawings. However, the present disclosure is not limited to the aspects set forth below, but may be implemented in various different forms. The following aspects are provided only to completely disclose the present disclosure and inform those skilled in the art of the scope of the present disclosure, and the present disclosure is defined only by the scope of the appended claims.

In addition, the shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description of the present disclosure, detailed description of well-known functions and configurations incorporated herein will be omitted when it is determined that the description may make the subject matter in some embodiments of the present disclosure rather unclear. The terms such as "including", "having", "containing", "comprising of", and "consist of" used herein are generally intended to allow other components to be added unless the terms are used with the term "only". As used herein, singular forms are intended to include plural forms unless the context clearly indicates otherwise.

In interpreting any elements or features of the embodiments of the present disclosure, it should be considered that any dimensions and relative sizes of layers, areas and regions include a tolerance or error range even when a specific description is not conducted.

Terms, such as first, second, A, B, (A), or (B) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element. Spatially relative terms, such as, "on", "over", "above", "below", "under", "beneath", "lower", "upper", "near", "close", "adjacent", and the like, may be used herein to describe one element or feature's relationship to another element(s) or feature(s) as illustrated in the figures, and it should be interpreted that one or more elements may be further "interposed" between the elements unless the terms such as "directly", "only" are used.

Any elements or features of the embodiments of the present disclosure are not limited to a specific meaning of the terms described above. The terms as used herein are merely for the purpose of describing examples and are not intended to limit the present disclosure. Although the terms "first", "second", and the like are used for describing various elements, or features, these elements are not confined by these terms. These terms are merely used for distinguishing one element from other elements. Therefore, a first element to be mentioned below may be a second element in a technical concept of the present disclosure.

The elements or features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, embodiments of the present disclosure will be described in detail with reference to the accompanying drawings.

FIG. 1 is a diagram schematically illustrating a sensing device 100 according to embodiments of the present disclosure.

Referring to FIG. 1, the sensing device 100 in accordance with embodiments of the present disclosure can include a sensing panel S-PNL and a sensing circuit S-CC etc. The sensing device 100 may be referred to as a sensor as well.

A plurality of pixels PXL can be disposed in a sensing area S/A of the sensing panel S-PNL.

The sensing circuit S-CC can drive and sense the sensing panel S-PNL. That is, the sensing circuit S-CC drives one or more pixels PXL and senses one or more pixels PXL.

The sensing circuit S-CC can drive one or more pixels PXL by supplying a driving signal to one or more pixels PXL, and sense one or more pixels PXL by detecting a sensing signal from one or more pixels PXL.

The sensing circuit S-CC can recognize biometric information (e.g., a fingerprint etc.) based on sensed signals obtained by sensing one or more pixels PXL.

Figure 2:
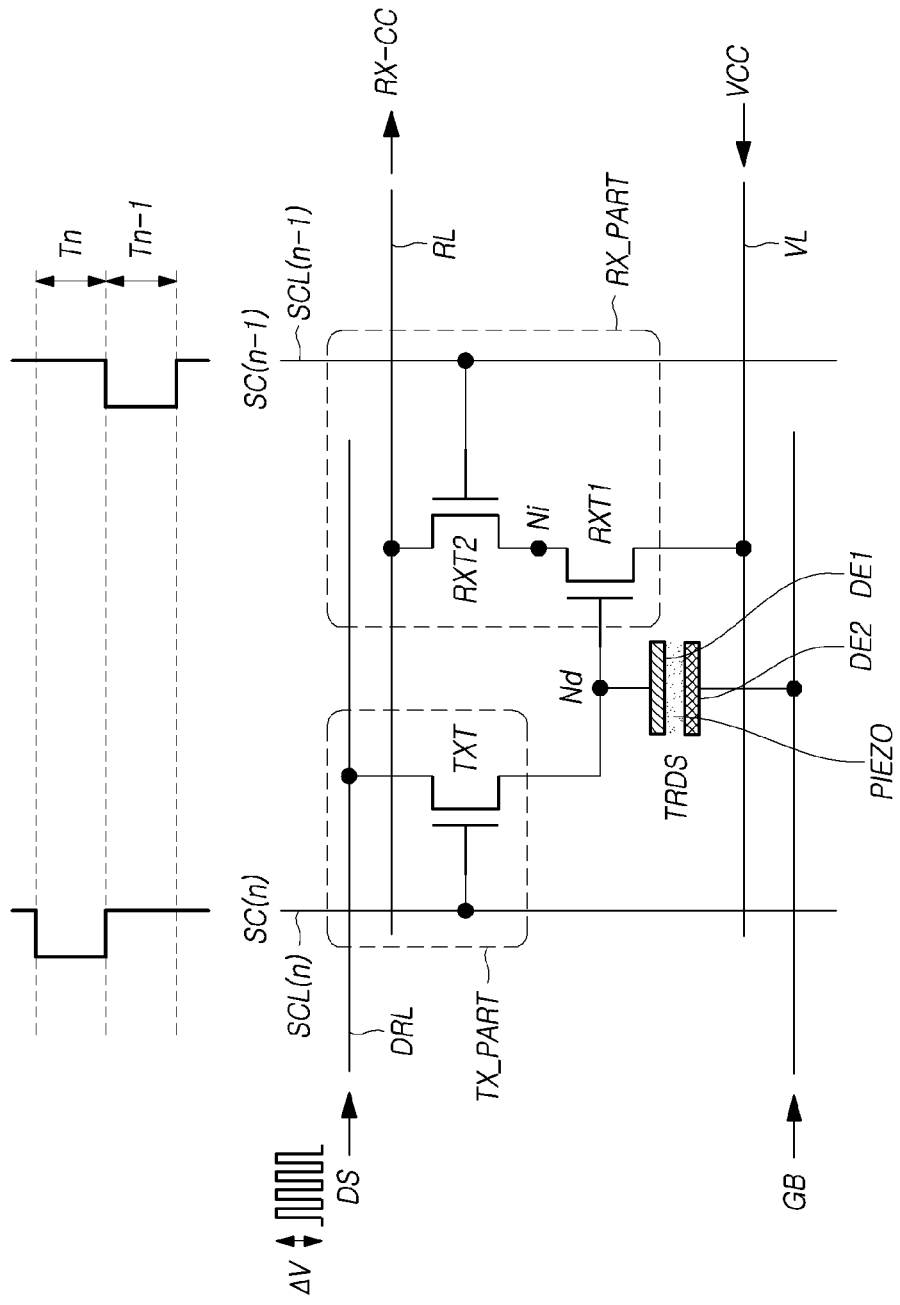
FIG. 2 is a diagram illustrating a pixel structure of the sensing device according to embodiments of the present disclosure.

FIG. 2 is a diagram illustrating a pixel structure of the sensing device 100 according to embodiments of the present disclosure.

Referring to FIG. 2, a pixel PXL disposed on the sensing panel S-PNL of the sensing device 100 can include a transducer TRDS including a first driving electrode DE1, a piezoelectric material layer PIEZO and a second driving electrode DE2, a transmission portion TX-PART that operates in a driving mode (or a transmission mode), and that enables a driving signal DS to be transmitted to the first driving electrode DE1 of the transducer TRDS, a reception portion RX-PART that operates in a sensing mode (or a reception mode), and that enables a readout circuit RX-CC to detect an electrical signal (or a sensing signal) through a readout line, and the like. The terms "driving" may be used as an equal meaning to "transmission TX," or may be used as an equal meaning to "reception RX."

As described above, the transducer TRDS can include the first driving electrode DE1, the piezoelectric material layer PIEZO and the second driving electrode DE2. A driving signal DS can be applied to the first driving electrode DE1 of the transducer TRDS through the transmission portion TX-PART. The first driving electrode DE1 or a point (a pattern, an electrode, etc.) with an electrical characteristic similar or identical thereto may be referred to as a driving node Nd. A bias voltage GB can be applied to the second driving electrode DE2.

For example, a driving signal DS applied to the first driving electrode DE1 can be, e.g., a signal with a certain amplitude (ΔV) and a variable voltage level, or be an AC signal (may be referred to as a pulse signal or a modulated signal). The driving signal DS may have various waveforms such as a square wave, a sine wave, a triangle wave, and the like.

The driving signal DS can be a signal supplied to one or more pixels (one or more driving pixels) to be driven among the plurality of pixels PXL.

For example, the bias voltage GB applied to the second driving electrode DE2 can be a different voltage from the driving signal DS. The bias voltage GB applied to the second driving electrode DE2 can be a DC voltage, and a voltage with a low voltage level.

When an AC type driving signal DS is applied to the first driving electrode DE1, and a DC type bias voltage GB with a low level is applied to the second driving electrode DE2, the piezoelectric material layer PIEZO can vibrate to generate a signal. For example, a signal generated from the transducer TRDS may be an electromagnetic wave, an ultrasonic wave, a sound wave, or the like.

Here, when a sound wave is generated from the transducer TRDS, the sound wave may have a range of approximately 16 Hz to 20 KHz. When the ultrasonic wave is generated from the transducer TRDS, the ultrasonic wave may have, e.g., frequencies above 20 KHz. That is, the ultrasonic wave generated from the transducer TRDS may have a period less than or equal to 50 μsec.

The piezoelectric material layer PIEZO can be formed of ZnO (zinc oxide), perovskite, etc., but not limited thereto. The piezoelectric material layer PIEZO can be formed of various piezoelectric materials.

Hereinafter, for convenience of description, it is considered that signals generated from the transducer TRDS are ultrasonic waves with frequencies above 20 KHz.

The transducer TRDS converts electrical energy into a different type of energy, resulting in a corresponding signal being generated, and convert a received signal into electrical energy, resulting in a corresponding signal being generated. That is, the transducer TRDS can be an energy conversion device and a signal generating device. For example, the transducer TRDS can be an ultrasonic wave transducer that generates ultrasonic waves depending on electrical energy applied to the first driving electrode DE1, and generates electrical energy when ultrasonic waves are received.

More specifically, in the transducer TRDS, when an AC type driving signal DS is applied to the first driving electrode DE1, and a DC type bias voltage with a low level is applied to the second driving electrode DE2, the piezoelectric material layer PIEZO vibrates and converts electrical energy by voltages DS and GB applied to the first and second driving electrodes DE1 and DE2 to ultrasonic waves, resulting in the ultrasonic waves being generated. Here, the vibration of the piezoelectric material layer PIEZO can mean that a polarization state of the piezoelectric material layer PIEZO is changed.

In the transducer TRDS, when ultrasonic waves are received to the piezoelectric material layer TRDS, the piezoelectric material layer PIEZO vibrates, and a voltage obtained from the conversion of ultrasonic waves into electrical energy is generated from the first driving electrode DE1. Here, the vibration of the piezoelectric material layer PIEZO can mean that a polarization state of the piezoelectric material layer PIEZO is changed.

The transmission portion TX-PART is a circuit portion that enables the transducer TRDS to generate a signal (an ultrasonic wave) in the driving mode (transmission mode).

The transmission portion TX-PART can include a transmission transistor TXT electrically connected between the first driving electrode DE1 and a driving line DRL to which a driving signal DS with a variable voltage level is applied.

Turn-on and turn-off of the transmission portion TX-PART can be controlled by an n-th scan signal SC(n) supplied through an n-th scan line SCL(n).

The transmission portion TX-PART can be turned on by the n-th scan signal (SC(n)), and transfer the driving signal DS supplied through the driving line DRL to the first driving electrode DE1 of the transducer TRDS.

The reception portion RX-PART is a circuit portion that enables a signal to be detected through the readout line RL in the sensing mode (reception mode).

The reception portion RX-PART can include a first reception transistor RXT1 and a second reception transistor RXT2 which are connected between the readout line RL and a power supply line VL. Here, the power supply line VL is a line to which a power supply voltage VCC is applied. Here, the power supply voltage VCC can be a DC voltage.

A source node or a drain node of the first reception transistor RXT1 can be electrically connected to the drain node or the source node of the source reception transistor RXT2. Here, a point (a node) to which the first reception transistor RXT1 and the second reception transistor RXT2 are connected may be referred to as an intermediate node Ni.

The first reception transistor RXT1 can be electrically connected between the intermediate node Ni and the power supply line VL. The first reception transistor RXT1 can be controlled by a voltage of the first driving electrode DE1 electrically connected to a gate node.

The second reception transistor can be electrically connected between the intermediate node Ni and the readout line RL. The second reception transistor RXT2 can be controlled by an (n−1)th scan signal SC(n−1) applied to the gate node through an (n−1)th scan line SCL(n−1).

In a situation where the (n−1)th scan signal SC(n−1) with a turn-on level voltage is applied to the gate node of the second reception transistor RXT2, when the first reception transistor RXT1 become turned on due to a change in voltage of the driving node Nd, the readout circuit RX-CC can be electrically connected to the power supply line VL.

Thus, the readout circuit RX-CC can detect the power supply voltage VCC or an electrical signal corresponding to the power supply voltage as a sensing signal.

One pixel PXL can be operated in the driving mode (transmission mode) or in the sensing mode (reception mode).

In the case of the pixel shown in FIG. 2, the pixel can be operated in the sensing mode (reception mode) during a Tn−1 interval. That is, during the Tn−1 interval, the (n−1)th scan signal SC(n−1) with a turn-on voltage level is applied to the gate node of the second reception transistor RXT2 in the corresponding pixel PXL. However, during the Tn−1 interval, in order for the corresponding pixel PXL to not be operated in the driving mode (transmission mode), the n-th scan signal SC(n) with a turn-off voltage level can be applied to the gate node of the transmission transistor TXT in the corresponding pixel PXL.

During the Tn−1 interval, when ultrasonic waves generated from one or more other pixels PXL are received to the corresponding pixel shown in FIG. 2 after having been reflected from adjacent areas, the piezoelectric material layer PIEZO of the transducer TRDS vibrates, and cause a change in voltage of the first driving electrode DE1 to occur. Thus, the first reception transistor RXT1 can be turned on. As a result, both the first and second reception transistors can be turned on, and the readout circuit RX-CC can detect a power supply voltage VCC of the power supply line VL as a sensing signal through the readout line RL.

In the case of the pixel shown in FIG. 2, the pixel can be operated in the driving mode (transmission mode) during a Tn interval other than the Tn−1 interval. That is, during the Tn interval, the n-th scan signal SC(n) with a turn-on voltage level can be applied to the gate node of the transmission transistor TXT in the corresponding pixel PXL. However, during the Tn interval, in order for the corresponding pixel PXL to not be operated in the sensing mode (reception mode), the (n−1)th scan signal SC(n−1) with a turn-off voltage level can be applied to the gate node of the second reception transistor RXT2 in the corresponding pixel PXL.

That is, during the Tn interval, the n-th scan signal SC(n) with a turn-on voltage level can be applied to the gate node of the transmission transistor TXT in the corresponding pixel PXL, and thus the transmission transistor becomes turned on. A driving signal DS can be applied to the first driving electrode DE1 of the transducer TRDS due to the turn-on of the transmission transistor TXT. At this time, a bias voltage GB has been applied to the second driving electrode DE2 of the transducer TRDS. Accordingly, the piezoelectric material layer PIEZO between the first driving electrode DE1 and the second driving electrode DE2 vibrates, and thus ultrasonic waves are generated.

The n-th scan line SCL(n) and the (n−1)th scan line SCL(n−1) can be disposed to correspond to each pixel column (or row) per pixel column (or row). That is, with respect to one pixel row (or a column), the n-th scan line SCL(n) and the (n−1)th scan line SCL(n−1) can be disposed to be corresponded to each pixel.

Alternatively, each of the n-th scan line SCL(n) and the (n−1)th scan line SCL(n−1) can be commonly connected to two or more pixel columns (or rows). That is, the (n−1)th scan line SCL(n−1) can be commonly connected to a reception portion RX-PART of a first pixel and a transmission portion TX-PART of one or more pixels PXL adjacent to the reception portion RX-PART of the first pixel. The n-th scan line SCL(n) can be commonly connected to a transmission portion TX-PART of a first pixel and a reception portion RX-PART of another pixel PXL adjacent to the transmission portion TX-PART of the first pixel.

Figure 3:
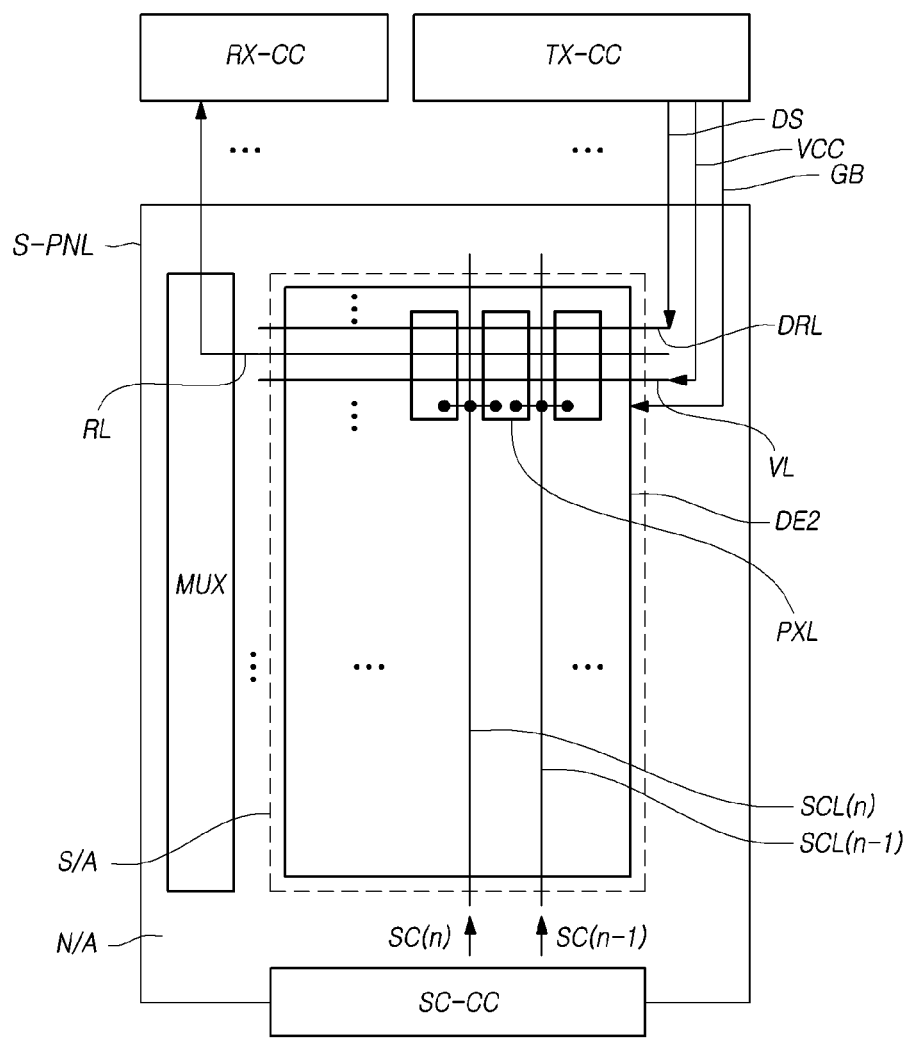
FIG. 3 is a diagram illustrating a signal system for operating the sensing device according to embodiments of the present disclosure.

FIG. 3 is a diagram illustrating a signal system for operating the sensing device 100 according to embodiments of the present disclosure.

Referring to FIG. 3, the sensing panel S-PNL can include a plurality of driving lines DRL, a plurality of power supply lines VL, a plurality of scan lines (SCL(n−1), SCL(n), . . . ), a plurality of readout lines RL, a second driving electrode DE2, or the like.

Each of the plurality of driving lines DRL, the plurality of power supply lines VL, the plurality of readout lines RL and the second driving electrode DE2 can be disposed in various shapes, arrangements, layouts, or structures, or with various numbers.

The driving line DRL can be disposed in a pixel row direction or a pixel column direction. Hereinafter, it is considered that for convenience of description, the driving line DRL is disposed in the pixel row direction, as shown in FIG. 3.

One driving line DRL can be disposed every one pixel row or two or more pixel rows. As another example, one driving line DRL can be disposed every one pixel column or two or more pixel columns. As further another example, the driving line DRL can be disposed in a mesh form.

The power supply line VL can be disposed in a pixel row direction or a pixel column direction. Hereinafter, it is considered that for convenience of description, the power supply line VL is disposed in the pixel row direction, as shown in FIG. 3.

One power supply line VL can be disposed every one pixel row or two or more pixel rows. As another example, one power supply line VL can be disposed every one pixel column or two or more pixel columns. As further another example, the power supply line VL can be disposed in a mesh form.

The scan lines (SCL(n−1), SCL(n), . . . ) can be disposed in a pixel row direction or a pixel column direction, e.g., disposed in parallel to the pixel row or the pixel column. Hereinafter, it is considered that for convenience of description, the scan lines (SCL(n−1), SCL(n), . . . ) are disposed in the pixel column direction, as shown in FIG. 3.

Each scan line (SCL(n−1), SCL(n)) can be commonly connected to two or more pixel columns (or two or more pixel rows). That is, the (n−1)th scan line SCL(n−1) can be disposed between two pixel columns, and the n-th scan line SCL(n) can be disposed between two pixel columns as well. For example, the (n−1)th scan line SCL(n−1) can be commonly connected to a reception portion RX-PART of a first pixel and a transmission portion TX-PART of another pixel PXL adjacent to the reception portion RX-PART of the first pixel. The n-th scan line SCL(n) can be commonly connected to a transmission portion TX-PART of a first pixel and a reception portion RX-PART of another pixel PXL adjacent to the transmission portion TX-PART of the first pixel.

The readout line RL can be disposed in parallel to a pixel row or a pixel column.

One readout line RL can be disposed every one pixel row or two or more pixel rows. As another example, one readout line RL can be disposed every one pixel column or two or more pixel columns.

The second driving electrode DE2 can be one large plate electrode in the form of a plate spread over the whole area of the sensing panel S-PNL. As another example, the second driving electrode DE2 may be divided into several portions, and the divided portions may be disposed in respective areas of the plurality of pixels PXL. Meanwhile, each first driving electrode DE1 can be disposed in an area of each of the plurality of pixels PXL.

Referring to FIG. 3, the sensing circuit S-CC can include a scanning circuit SC-CC, a transmission circuit TX-CC, a reception circuit RX-CC, a multiplexer MUX, or the like, and further include a sensing controller. The sensing controller may be included in the reception circuit RX-CC.

The scanning circuit SC-CC can output the n-th scan signal and the (n−1)th scan signal SL(n−1) to the n-th scan line SCL(n) and the (n−1)th scan line SCL(n−1), respectively.

Thus, a first pixel column of a plurality of pixel columns can be operated in the driving mode, and a second pixel column thereof can be operated in the sensing mode. A pixel column operated in the driving mode may mean one or more pixels generating ultrasonic waves, and a pixel column operated in the sensing mode may mean one or more pixels receiving ultrasonic waves. At a certain time or in a certain time interval, one or more pixels PXL operated in the driving mode may be different from, or identical to, one or more pixels PXL operated in the sensing mode which are adjacent to the one or more pixels PXL operated in the driving mode.

The transmission circuit TX-CC can output a driving signal DS, a bias voltage GB and a power supply voltage VCC to the sensing panel S-PNL.

The driving signal DS can be supplied to a driving line DRL corresponding to a pixel column operated in the driving mode and disposed in the sensing panel S-PNL.

The bias voltage GB can be applied to the second driving electrode DE2 disposed on the sensing panel S-PNL.

The power supply voltage VCC can be supplied to the power supply line VL disposed on the sensing panel S-PNL.

The transmission circuit TX-CC, the reception circuit RX-CC, and the sensing controller may be implemented as separate components, or implemented as one component in which at least two of the transmission circuit TX-CC, the reception circuit RX-CC, and the sensing controller are integrated into the one component. Alternatively, all of the transmission circuit TX-CC, the reception circuit RX-CC, and the sensing controller may be integrated into one component.

The multiplexer MUX may be included in the reception circuit RX-CC, or be disposed in a sensing edge area N/A corresponding to an edge area of a sensing area S/A of the sensing panel S-PNL. Such a multiplexer can be implemented by including a plurality of switching elements (transistors).

The scanning circuit SC-CC can be located outside of the sensing panel S-PNL, or located in the sensing edge area N/A of the sensing panel S-PNL.

Figure 4:
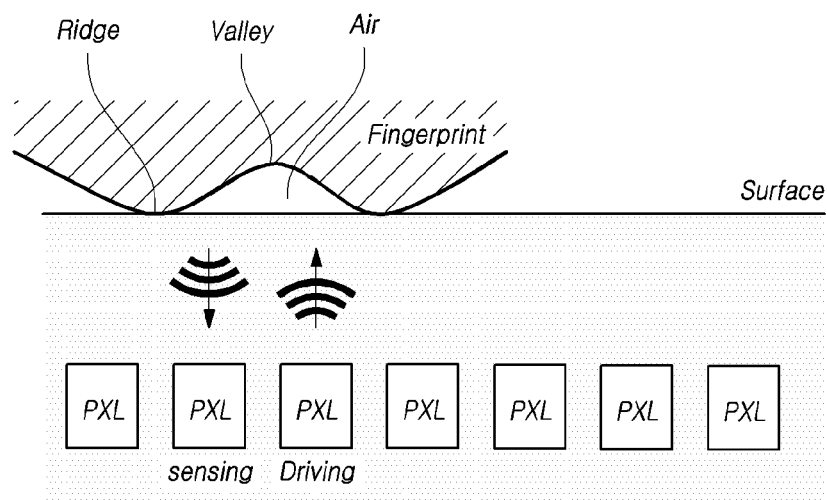
FIG. 4 illustrates a sensing principle and an example application of the sensing device according to embodiments of the present disclosure.

FIG. 4 is a diagram illustrating a sensing principle of and an example application of the sensing device 100 according to embodiments of the present disclosure.

Referring to FIG. 4, the sensing device 100 in accordance with embodiments of the present disclosure can recognize (detect) the fingerprint of a finger based on ultrasonic waves.

When one or more driving pixels D-PXL operated in the driving mode among the plurality of pixels PXL are driven, and ultrasonic waves are generated in the one or more driving pixels D-PXL, the generated ultrasonic waves can be reflected from the fingerprint of the finger that has contacted a surface (may be a surface of a cover glass) of the sensing device 100.

The fingerprint is formed by ridges and valleys. The ridges contact the surface of the sensing device 100, or are closer to the surface of the sensing device 100 than the valleys. The valleys may not contact the surface of the sensing device 100, or be further spaced apart from the surface of the sensing device 100 compared with the ridges.

There exists air between the surface of the sensing device 100 and the skin of the valleys of the fingerprint. When ultrasonic waves generated from the driving pixel D-PXL reach the air layer, most of ultrasonic waves reached the air layer may be reflected due to a difference between the surface of the sensing device 100 and the acoustic impedance of air, and then travel inside the sensing device 100.

The ridges of the fingerprint contact the surface of the sensing device 100. The ultrasonic waves generated from the driving pixel D-PXL reach the skin of the ridges. Some of ultrasonic waves having reached the skin of the ridges may be reflected, but most of the ultrasonic waves may be reflected from the inside area of the skin after having traveled up to the inside of the skin.

Accordingly, ultrasonic waves received to the sensing pixel S-PXL of the sensing device 100 after having been reflected from each of the ridges and the valleys of the fingerprint can have different reception intensities or reception times (reception delays), and as a result of this, the sensing device 100 can detect the fingerprint by distinguishing fingerprint features of the ridges and the valleys.

Thus, since the sensing device 100 uses a sensing scheme allowing an inside area of the skin to be sensed, it is not sensitive to the contamination or condition of the skin surface, and it is possible to provide high security related to the fingerprint corresponding to personal information.

Figure 5:
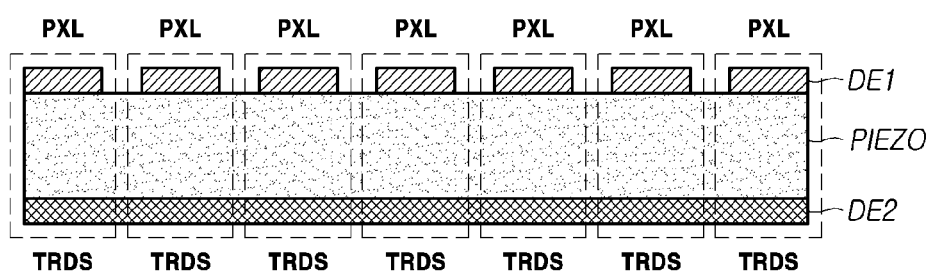
FIGS. 5, 6, 7, and 8 are diagrams illustrating a transducer included in a plurality of pixels in a sensing panel of the sensing device according to embodiments of the present disclosure.
Figure 8:
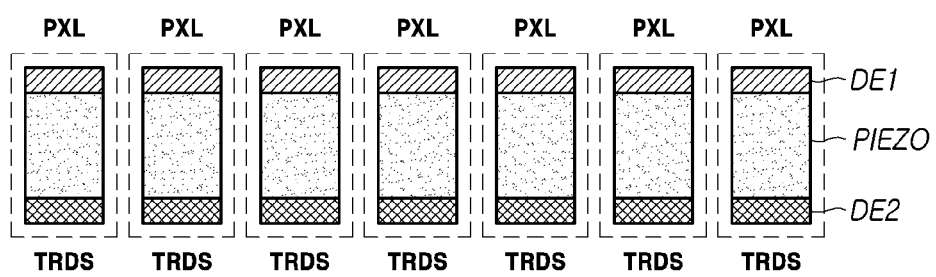

FIGS. 5 and 8 are diagrams illustrating a transducer TRDS included in a plurality of pixels PXL in the sensing panel S-PNL of the sensing device 100 according to embodiments of the present disclosure.

Referring to FIGS. 5 to 8, each pixel PXL includes a transducer TRDS, and the transducer TRDS includes a first driving electrode DE1, a piezoelectric material layer PIEZO, and a second driving electrode DE2.

Figure 6:
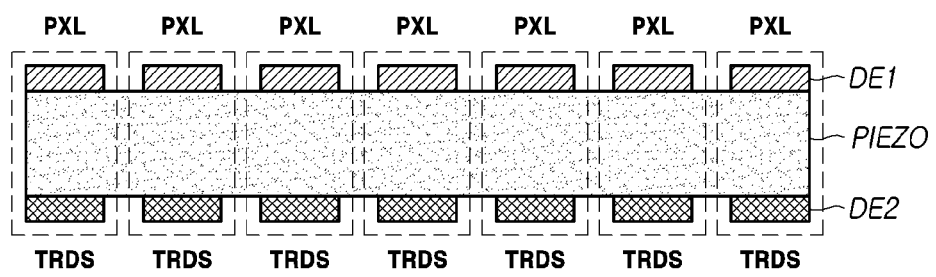
Figure 7:
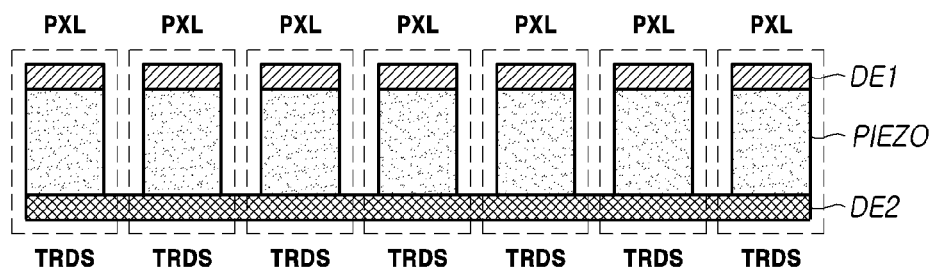

As illustrated in FIGS. 5 and 6, in the sensing panel S-PNL, the piezoelectric material layer PIEZO can be in the form of a plate, and be disposed commonly in the whole area of a plurality of pixels. Alternatively, as illustrated in FIGS. 7 and 8, in the sensing panel S-PNL, the piezoelectric material layer PIEZO can be divided into portions corresponding to sizes of respective areas of the plurality of pixels. That is, the piezoelectric material layer PIEZO may be configured to be spread over the whole of the pixels, or be divided into several portions and then the divided portions may be disposed in respective pixel areas.

As illustrated in FIGS. 5 and 7, the second driving electrode DE2 can be in the form of a plate, and be disposed commonly in the whole area of the plurality of pixels. Alternatively, as illustrated in FIGS. 6 and 8, the second driving electrode DE2 can be divided into portions corresponding to sizes of respective areas of the plurality of pixels PXL, and the divided portions can be disposed in respective areas of the plurality of pixels PXL. In other words, the second driving electrode DE2 may be configured to be spread over the whole area of the pixels, or be divided into several portions and then the divided portions may be disposed in respective pixel areas.

Figure 9:
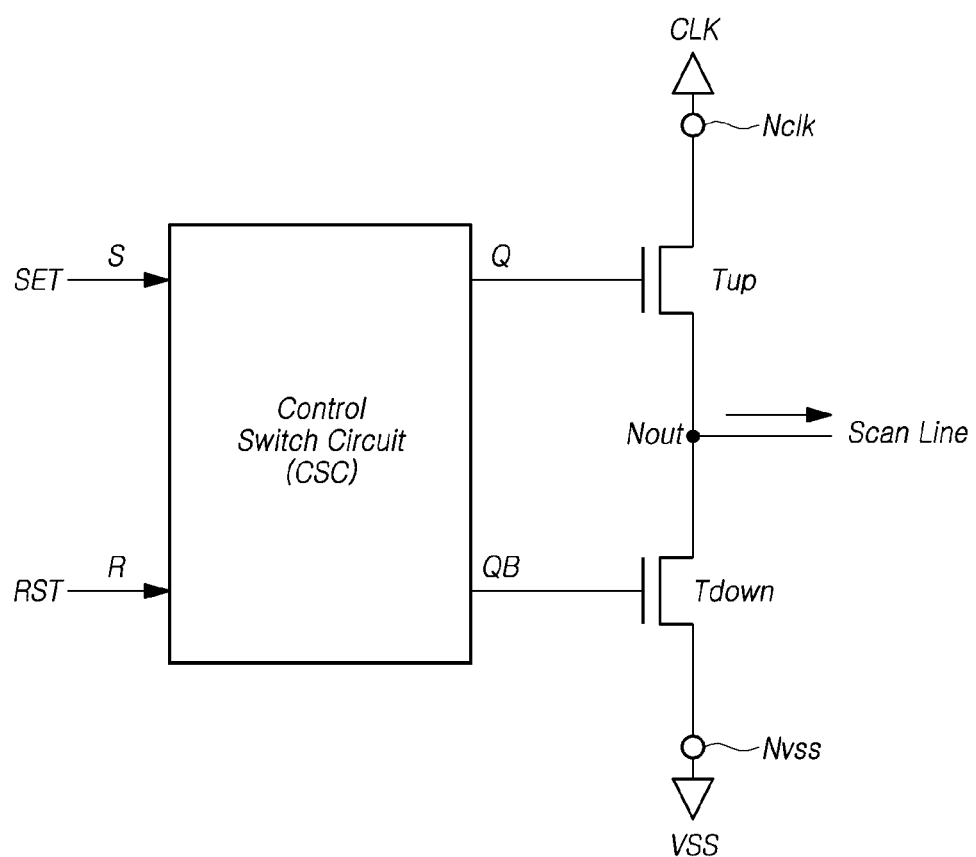
FIG. 9 is a diagram illustrating a scanning circuit in a sensing circuit of the sensing device according to embodiments of the present disclosure.

FIG. 9 is a diagram illustrating a scanning circuit SC-CC in the sensing circuit S-CC of the sensing device 100 according to embodiments of the present disclosure.

FIG. 9 shows briefly a part corresponding to one scan line in the scanning circuit SC-CC, and the scanning circuit SC-CC can output, according to a predetermined timing, a scan signal SC(n−1) and a scan signal SC(n) to a scan line SCL(n−1) and a scan line SCL(n), respectively. That is, in FIG. 9, a scan signal can be one of the scan signal SC(n−1) and the scan signal SC(n), and a scan line can be one of the scan line SCL(n−1) and the scan line SCL(n).

The scanning circuit SC-CC can include a pull-up transistor Tup, a pull-down Tdown, a control switch circuit CSC, and the like.

The control switch circuit CSC can control a voltage of a Q node corresponding to the gate node of the pull-up transistor Tup and a voltage of a QB node corresponding to the gate node of the pull-down transistor Tdown, and include several switches (transistors).

The pull-up transistor Tup is a transistor for supplying a scan signal with a first level of voltage to a corresponding scan line through a scan signal output node Nout. The pull-down transistor Tdown is a transistor for supplying a scan signal with a second level of voltage to a corresponding scan line through the scan signal output node Nout. The pull-up transistor Tup and the pull-down transistor Tdown can be turned on a different timing from each other.

The first level of voltage is a voltage for enabling a transistor (TXT or RXT2) in one or more pixels connected to the scan line to be turned on. For example, the first level of voltage can be a high level voltage. The second level of voltage is a voltage for enabling a transistor (TXT or RXT2) in one or more pixels connected to the scan line to be turned off. For example, the first level of voltage can be a low level voltage.

The pull-up transistor Tup is electrically connected between a clock signal applying node Nclk to which a clock signal CLK is applied and the scan signal output node Nout electrically connected to the scan line, and turned on or turned off depending on a voltage in the Q node.

The gate node of the pull-up transistor Tup is electrically connected to the Q node. The drain node or the source node of the pull-up transistor Tup is electrically connected to the clock signal applying node Nclk. The source node or the drain node of the pull-up transistor Tup is electrically connected to the scan signal output node Nout.

The pull-up transistor Tup is turned on by the voltage in the Q node, and outputs a scan signal with the first level of voltage in a high level interval of the clock signal CLK to the scan signal output node Nout.

The scan signal with the first level of voltage outputted to the scan signal output node Nout is supplied to a corresponding scan line.

The pull-down transistor Tdown is electrically connected between the scan signal output node Nout and a low voltage node Nvss, and turned on or turned off depending on a voltage in the QB node.

The gate node of the pull-down transistor Town is electrically connected to the QB node. The drain node or the source node of the pull-down transistor Tdown is electrically connected to the low voltage node Nvss. A low voltage corresponding to a constant voltage is applied to the drain node or the source node of the pull-down transistor Tdown. The source node or the drain node of the pull-down transistor Tdown is electrically connected to the scan signal output node Nout for outputting a gate signal Vgate.

The pull-down transistor Tdown is turned on by the voltage in the QB node, and outputs a scan signal with the second level of voltage to the scan signal output node Nout. Thus, the scan signal with the second level of voltage can be supplied to a corresponding scan line through the scan signal output node Nout. Here, the scan signal with the second level of voltage can be, e.g., a low voltage VSS.

Meanwhile, the control switch circuit CSC can include at least two transistors etc., and the Q node, the QB node, a set node (S, may be referred to as a start node), a reset node R, or the like. In some embodiments, the control switch circuit CSC can further include an input node to which various voltages are inputted, or the like.

In the control switch circuit CSC, the Q node is electrically connected to the gate node of the pull-up transistor Tup, and charging and discharging in the Q node are repeated. In the control switch circuit CSC, the QB node is electrically connected to the gate node of the pull-down transistor Tdown, and charging and discharging in the QB node are repeated.

In the control switch circuit CSC, a set signal SET for instructing gate driving of a corresponding gate driving circuit GDC to be initiated is applied to the set node S. Here, the set signal SET applied to the set node S may be a start signal VST inputted from the outside of the scanning circuit SC-CC, or a signal (a carry signal) fed back from a scan signal outputted from a scanning circuit in a previous stage earlier than the current scan stage.

In the control switch circuit CSC, a reset signal RST applied to the reset node R may be a reset signal for simultaneously resetting the scanning circuit SC-CC in all stages, or a carry signal inputted from another stage (a previous stage or a later stage).

The control switch circuit CSC charges the Q node in response to the set signal SET, and discharges the Q node in response to the reset signal RST. The control switch circuit CSC can include an inverter circuit for charging or discharging each of the Q node and the QB node in a different timing from each other.

Figure 10:
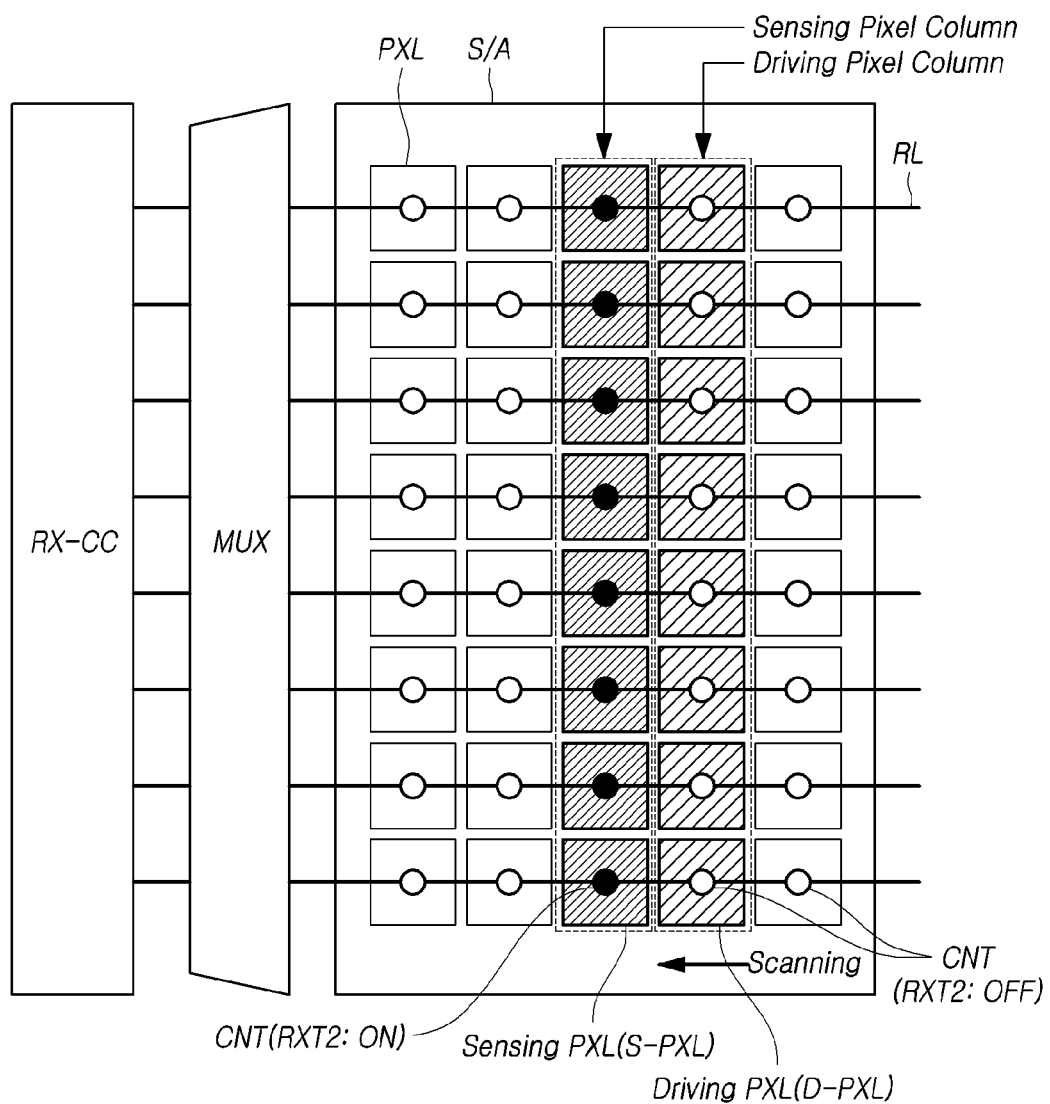
FIGS. 10 and 11 illustrate sensing driving of the sensing device, and sensing operation for each pixel column in two scanning directions according to embodiments of the present disclosure.
Figure 11:
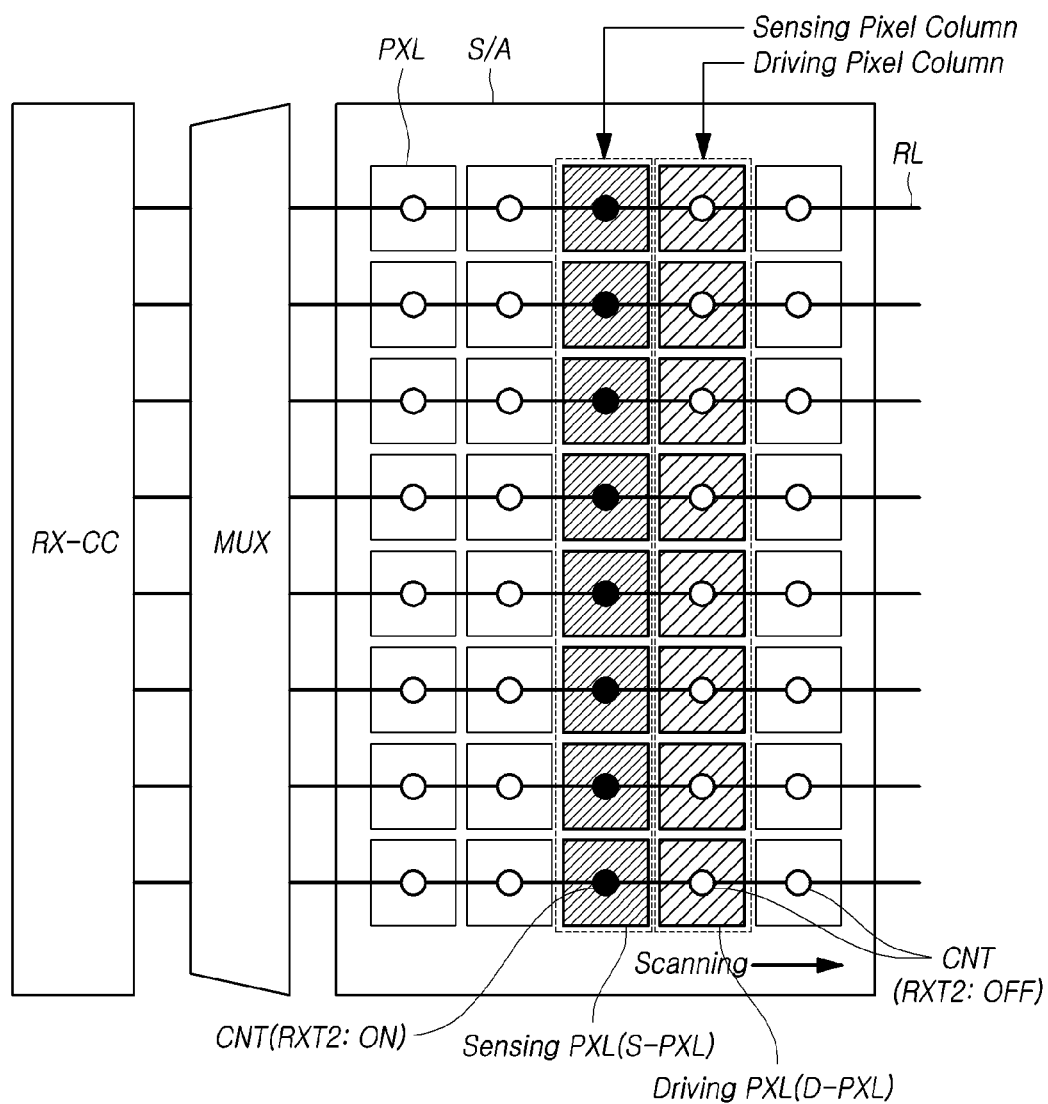

FIGS. 10 and 11 illustrate sensing driving (S-PXL, RL, MXU, RX-CC) of the sensing device 100 and sensing operation for each pixel column in two scanning directions according to embodiments of the present disclosure.

Referring to FIGS. 10 and 11, one readout line RL can be disposed in each of a plurality of pixel rows.

Each readout line RL can be electrically connected to the source node or the drain node of a second reception transistor RXT2 of each of one or more pixels PXL included in a corresponding pixel row. That is, one readout line RL can be electrically connected to source nodes or drain nodes of respective second reception transistors RXT2 of a plurality of pixels PXL through a plurality of contact points CNT.

For example, an insulating layer can be disposed on the source node or the drain node of the second reception transistor RXT2 of each of the plurality of pixels PXL, and the readout line can be disposed on the insulating layer. The readout line RL can be electrically connected to the source nodes or the drain nodes through contact holes of the insulating layer at the contact points CNT.

Referring to FIGS. 10 and 11, at a certain time point or in a certain time interval, one of the plurality of pixel columns can be a driving pixel column, and another pixel column adjacent to the driving pixel column can be a sensing pixel column. Pixels included in the driving pixel column may be referred to as a driving pixel D-PXL. Pixels included in the sensing pixel column may be referred to as a sensing pixel D-PXL.

One or more pixels corresponding to the driving pixel D-PXL operated in the driving mode (transmission mode) can generate ultrasonic waves, and one or more pixels corresponding to the sensing pixels S-PXL operated in the sensing mode (reception mode) can receive ultrasonic waves reflected from a fingerprint after ultrasonic waves have been generated by the one or more pixels corresponding to the driving pixel D-PXL.

One or more second reception transistors RXT2 included in the one or more pixels corresponding to the sensing pixels S-PXL are turned on. One or more second reception transistors RXT2 included in the one or more pixels corresponding to the driving pixel D-PXL are turned off. One or more second reception transistors RXT2 included one or more pixels PXL other than the one or more pixels corresponding to the sensing pixels S-PXL and the one or more pixels corresponding to the driving pixel D-PXL is turned off. Accordingly, a reception circuit RX-CC can detect only signals from the one or more pixels corresponding to the sensing pixels S-PXL through the readout line RL.

As illustrated in FIGS. 10 and 11, a sensing pixel column can be a pixel column closer to the multiplexer MUX than a driving pixel column. When the location of the transmission portion TX-PART and the reception portion RX-PART is changed, or a current driving scheme is switched, in the pixel circuit as illustrated in FIGS. 11 and 12, a driving pixel column may be a pixel column closer to the multiplexer MUX than a sensing pixel column.

Meanwhile, as illustrated in FIG. 10, the sensing circuit S-CC may sense all pixels PXL by sequentially selecting and scanning sensing pixel columns in a first direction toward the multiplexer MUX.

Alternatively, as illustrated in FIG. 11, the sensing circuit S-CC can sense all pixels PXL by sequentially selecting and scanning sensing pixel columns in a second direction away from the multiplexer MUX.

Figure 12:
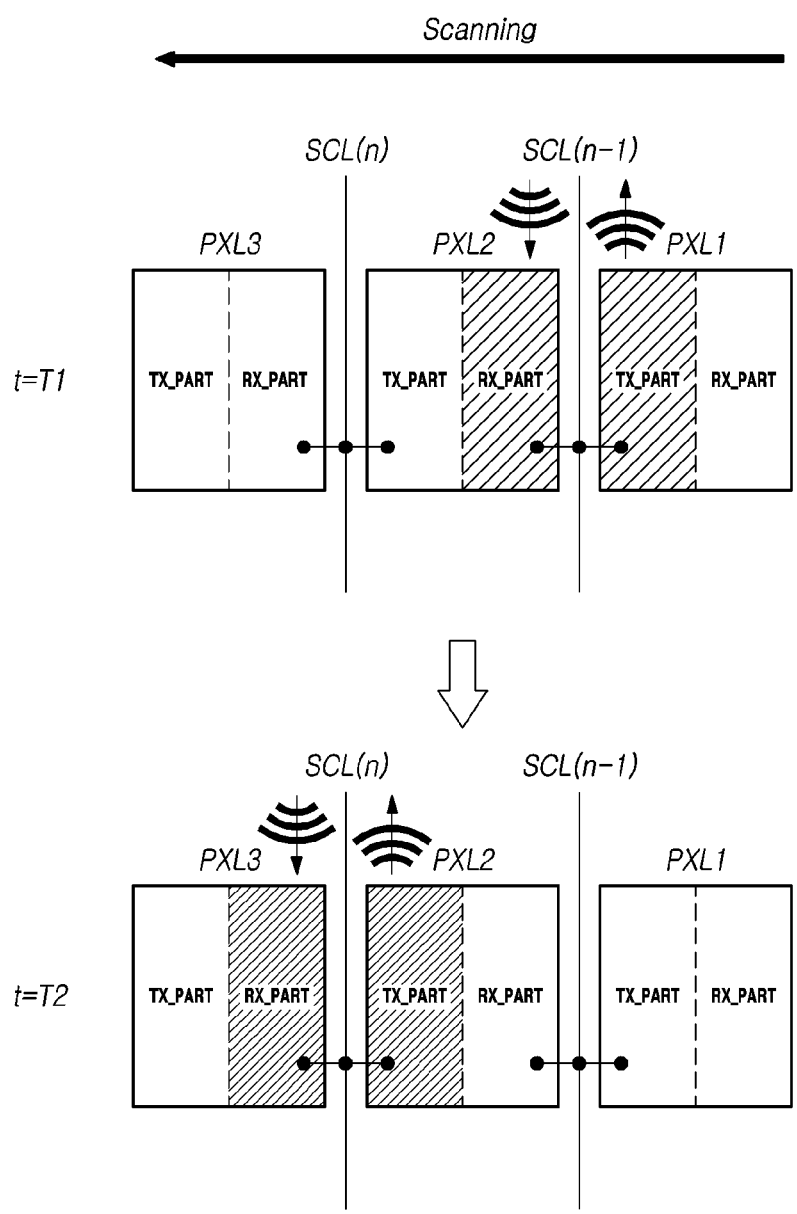
FIGS. 12 and 13 illustrate, during a first interval and a second interval, the scanning and the driving timing of a first pixel, a second pixel and a third pixel in the sensing device according to embodiments of the present disclosure.
Figure 13:
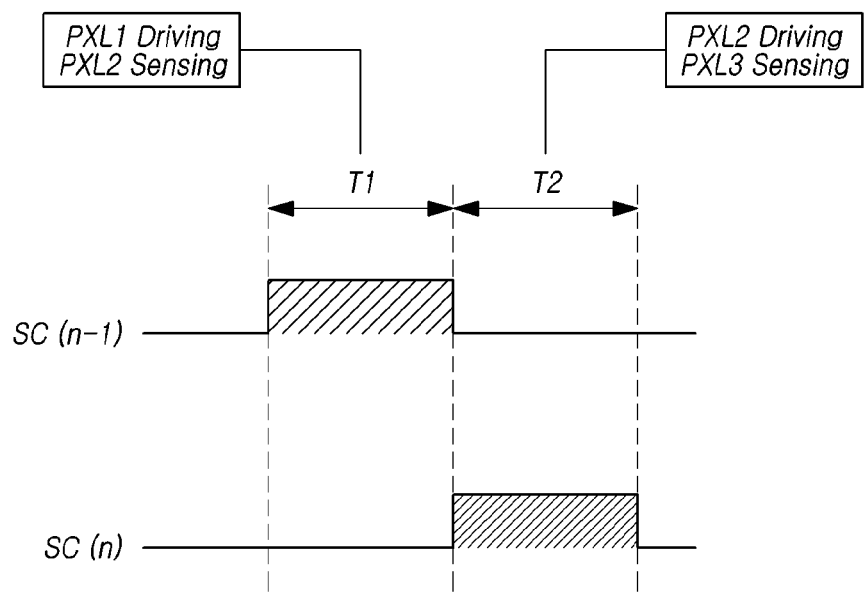

FIGS. 12 and 13 illustrate, during a first interval (t=T1) and a second interval (t=T2), scanning and the driving timings of a first pixel PXL1, a second pixel PXL2 and a third pixel PXL3 in the sensing device 100 according to embodiments of the present disclosure.

Referring to FIG. 12, the first pixel PXL1, the second pixel PXL2 and the third pixel PXL3 are sequentially disposed adjacently.

FIGS. 12 and 13 show that a scanning direction is a direction toward the multiplexer MUX. Thus, the first pixel PXL1 may be located farthest from the multiplexer MUX, and the third pixel PXL3 may be located closest to the multiplexer MUX, of the first pixel PXL1, the second pixel PXL2 and the third pixel PXL3.

When the scanning direction is a direction away from the multiplexer MUX, the first pixel PXL1 may be located closest to the multiplexer MUX, and the third pixel PXL3 may be located farthest from the multiplexer MUX.

Referring to FIGS. 12 and 13, during the first interval (t=T1), the first pixel PXL1 is a driving pixel D-PXL, and the second pixel PXL2 is a sensing pixel S-PXL.

Referring to FIGS. 12 and 13, during the first interval (t=T1), an (n−1)th scan signal SC(n−1) with a turn-on level of voltage supplied to an (n−1)th scan line SCL(n−1) is commonly applied to both the gate node of a transmission transistor TXT of the first pixel PXL1 and the gate node of a second reception transistor RXT2 of the second pixel PXL2.

Accordingly, ultrasonic waves are generated from a transducer TRDS according to a driving operation of the transmission portion TX-PART of the first pixel PXL1, and the generated ultrasonic waves may be reflected from the fingerprint of a finger and then received to a piezoelectric material layer of a transducer TRDS of the second pixel PXL2. Thus, the sensing circuit S-CC can detect a signal through a readout line RL corresponding to the second pixel PXL2.

Referring to FIGS. 12 and 13, during the second interval (t=T2), the second pixel PXL2 is a driving pixel D-PXL, and the third pixel PXL3 is a sensing pixel S-PXL.

Referring to FIGS. 12 and 13, during the second interval (t=T2), an n-th scan signal SC(n) with a turn-on level of voltage supplied to an n-th scan line SCL(n) is commonly applied to both the gate node of a transmission transistor TXT of the second pixel PXL2 and the gate node of a second reception transistor RXT2 of the third pixel PXL3.

Accordingly, ultrasonic waves are generated from a transducer TRDS according to a driving operation of the transmission portion TX-PART of the second pixel PXL2, and the generated ultrasonic waves may be reflected from the fingerprint of a finger and then received to a piezoelectric material layer of a transducer TRDS of the third pixel PXL3. Thus, the sensing circuit S-CC can detect a signal through a readout line RL corresponding to the third pixel PXL3.

Meanwhile, as described above, since the sensing device 100 based on the pixel structure of FIG. 2 uses a sensing scheme allowing an inside area of the skin to be sensed, therefore, it is not sensitive to the contamination or condition of the skin surface, and it is possible to provide high security related to the fingerprint corresponding to personal information.

In addition, since the sensing device 100 based on the pixel structure of FIG. 2 does not require a separate light source, it is therefore advantageous to downsize the sensing device, compared with other sensing devices.

Meanwhile, the ultrasonic waves generated from the transducer TRDS may have, e.g., frequencies above 20 KHz. That is, the ultrasonic wave generated from the transducer TRDS may have a period less than or equal to 50 μsec. Accordingly, in accordance with the pixel structure of FIG. 2, a driving signal DS for enabling the piezoelectric material layer PIEZO to be vibrated and ultrasonic waves to be generated is an AC signal with frequencies (ultrasonic wave frequency) over 20 KHz.

Thus, in accordance with the pixel structure of FIG. 2, since an AC type driving signal DS with frequencies (ultrasonic wave frequency) over 20 KHz may be applied to the whole area of the sensing panel S-PNL, there may be a disadvantage that increases power consumption, and that reduces sensitivity due to the delay of a waveform caused by the AC type driving signal DS.

These disadvantages may be greater as the size of the sensing panel S-PNL increases. Accordingly, it may be difficult for the sensing device 100 using the pixel structure of FIG. 2 to be applied to a large area sensor.

Hereinafter, a pixel structure is provided for reducing power consumption, preventing the delay of a signal, and enabling a large area sensor to be implemented advantageously.

Figure 14:
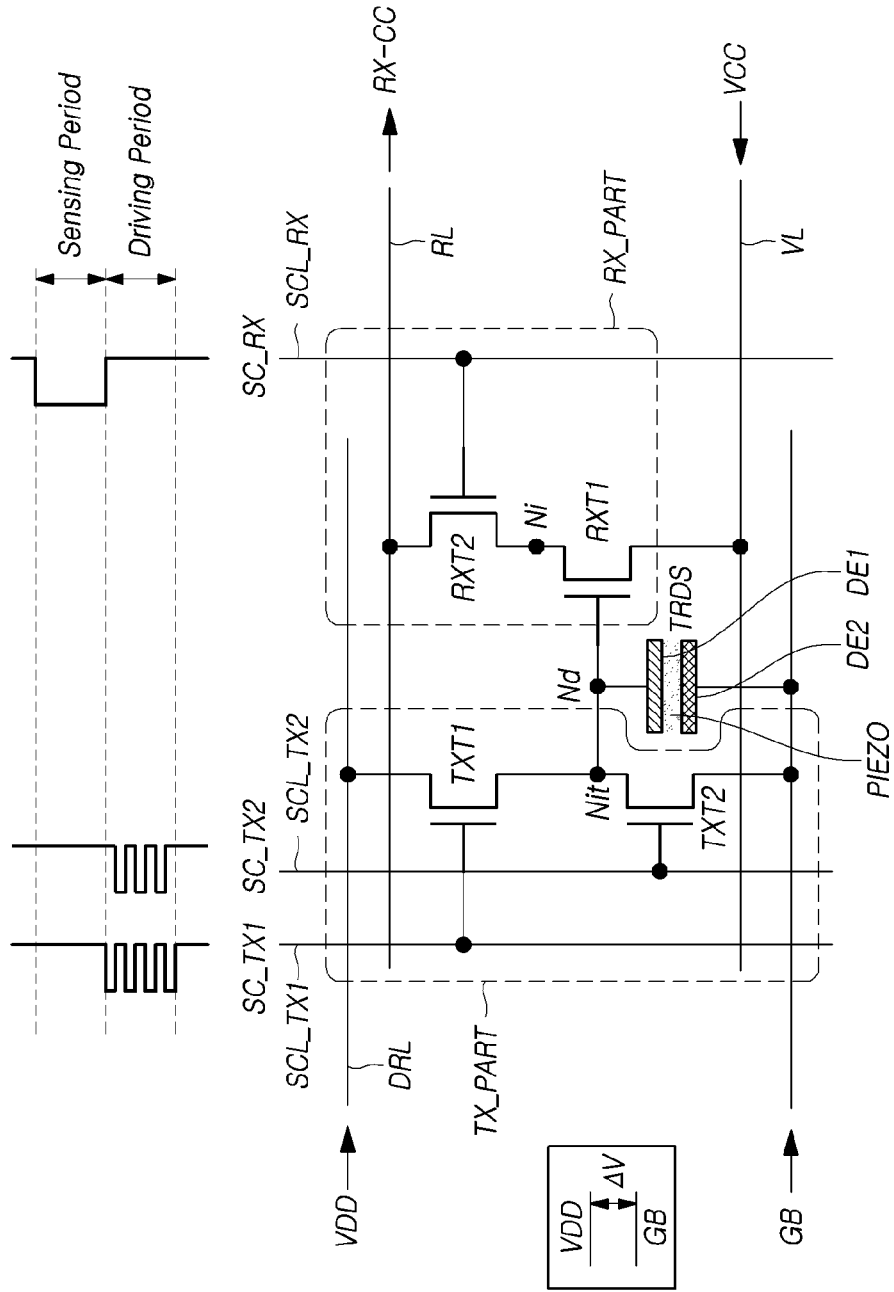
FIGS. 14 and 15 are diagrams illustrating a different pixel structure of the sensing device according to embodiments of the present disclosure.
Figure 15:
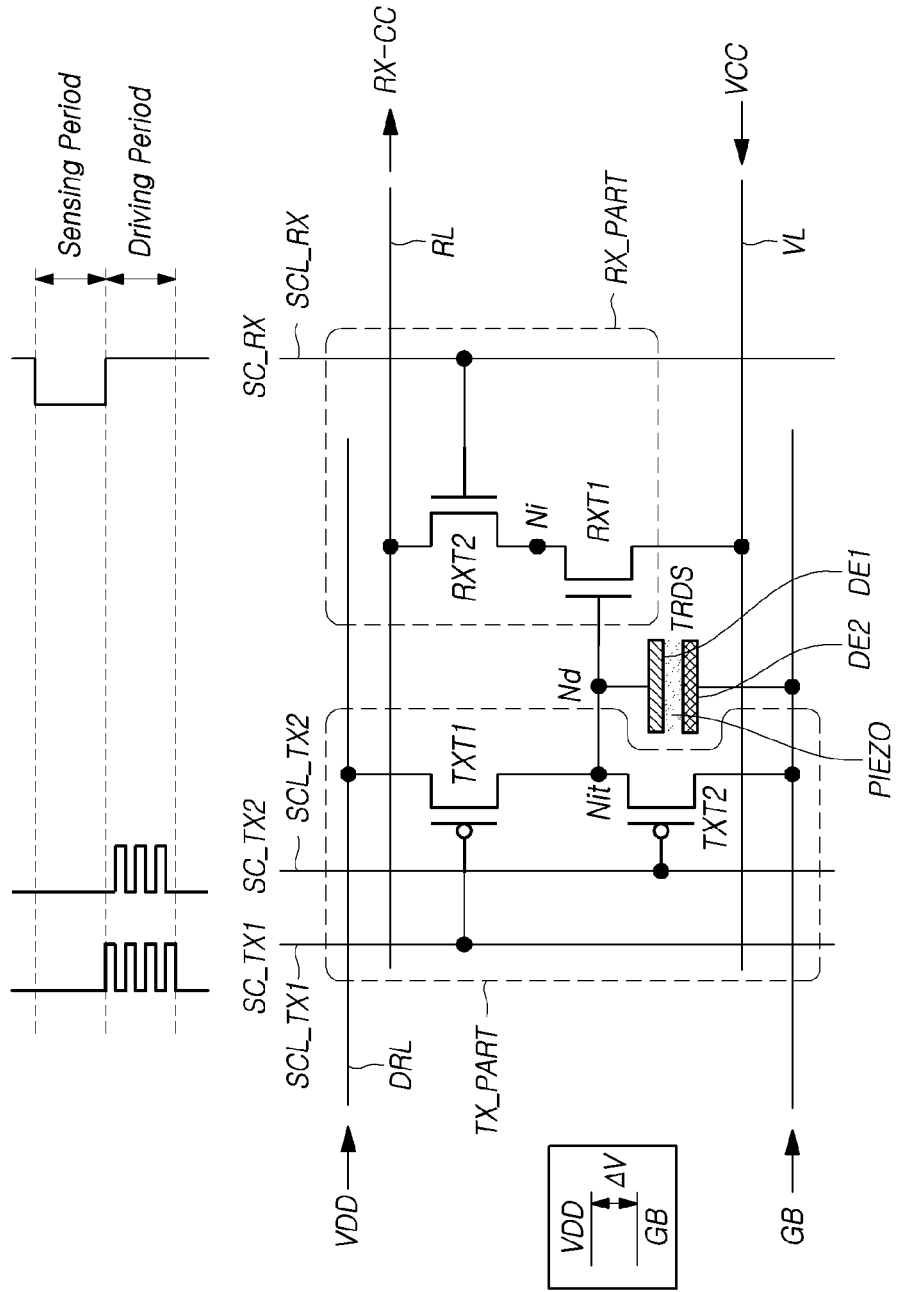

FIGS. 14 and 15 are diagrams illustrating a different pixel structure of the sensing device 100 according to embodiments of the present disclosure.

As described above, the sensing device 100 according to embodiments of the present disclosure can include: a sensing panel S-PNL including a plurality of pixels, and a sensing circuit S-CC that drives one or more first pixels PXL1, which are selected as a driving pixel D-PXL, of the plurality of pixels PXL, and detects a sensing signal from one or more second pixels PXL2 that are adjacent to the one or more first pixel PXL1, and correspond to a sensing pixel S-PXL, of the plurality of pixels PXL.

Each of the plurality of pixels PXL can include a transducer TRDS, a transmission portion TX_PART, a reception portion RX_PART, and the like.

The transducer TRDS can include a first driving electrode DE1, a piezoelectric material layer PIEZO and a second driving electrode DE2. Here, a second driving voltage GB can be applied to the second driving electrode DE2.

The transmission portion TX_PART can include a first transmission transistor TXT1 and a second transmission transistor TXT2.

The first transmission transistor TXT1 and the second transmission transistor TXT2 can be connected between a driving line DRL and a second driving electrode DE2. Here, the driving line DRL is a line to which a first driving voltage VDD is supplied.

The first transmission transistor TXT1 can be electrically connected between a connection node Nit and the driving line DRL. Here, the connection node Nit is a connection point (node) to which the first transmission transistor TXT1 and the second transmission transistor TXT2 are electrically connected.

The second transmission transistor TXT2 can be electrically connected between the connection node Nit and the second driving electrode DE2.

The gate node of the first transmission transistor TXT1 can be electrically connected to a first transmission scan line SCL_TX1, and the gate node of the second transmission transistor TXT2 can be electrically connected to a second transmission scan line SCL_TX2 different from the first transmission scan line SCL_TX1.

The reception portion RX_PART can include a first reception transistor RXT1 and a second reception transistor RXT2.

The first reception transistor RXT1 and the second reception transistor RXT2 can be connected between a readout line RL and a power supply line VL to which a power supply voltage VCC is supplied.

The first reception transistor RXT1 can be electrically connected between an intermediate node Ni and the power supply line VL. The first reception transistor RXT1 and the second reception transistor RXT2 can be connected to the intermediate node Ni.

The second reception transistor RXT2 can be controlled by a reception scan signal SC_RX, and electrically connected between the intermediate node Ni and the readout line RL.

During an interval in which the first pixel PXL1 is driven as a driving pixel D-PXL, a second reception transistor RXT2 included in the first pixel PXL1 can be turned off.

During the interval in which the first pixel PXL1 is driven as the driving pixel D-PXL, in the second pixel PXL2 corresponding to a sensing pixel S-PXL, a second reception transistor RXT2 can be turned on, and both a first transmission transistor TXT1 and a second transmission transistor TXT2 can be turned off.

Meanwhile, before or after the interval in which the first pixel PXL1 is driven as the driving pixel D-PXL, when an interval in which the first pixel PXL1 is sensed as a sensing pixel S-PXL runs, a first transmission transistor TXT1 and a second transmission transistor TXT2 included in the first pixel PXL1 can be turned off and the second reception transistor RXT2 can be turned on.

Meanwhile, the first driving voltage VDD supplied to the driving line DRL can be a DC voltage.

In the pixel structure of FIG. 2, an AC type driving signal DS is supplied to the driving line DRL; on the contrary, in the pixel structure of FIGS. 14 and 15, the DC type first driving voltage VDD is supplied to the driving line DRL.

The second driving voltage GB applied to the second driving electrode DE2 can be a DC voltage.

The first driving voltage VDD and the second driving voltage GB can be DC voltages each having a different level from the other.

During the interval in which the first pixel PXL1 is driven, in the first pixel PXL1, the first transmission transistor TXT1 can repeat between turn-on and turn-off, and the second transmission transistor TXT2 can repeat between turn-on and turn-off as well.

In this case, the first transmission transistor TXT1 and the second transmission transistor TXT2 are turned on and turned off at a different timing from each other. That is, at an identical timing, a repetition between turn-on and turn-off of the second transmission transistor TXT2 can be opposite to that of the first transmission transistor TXT1.

In other word, when the first transmission transistor TXT1 is turned on, the second transmission transistor TXT2 is turned off, and when the first transmission transistor TXT1 is turned off, the second transmission transistor TXT2 is turned on.

Accordingly, during the interval in which the first pixel PXL1 is driven, in the first pixel PXL1, a first transmission scan signal SC_TX1 applied to the gate node of the first transmission transistor TXT1 through the first transmission scan line SCL_TX1 and a second transmission scan signal SC_TX2 applied to the gate node of the second transmission transistor TXT2 through the second transmission scan line SCL_TX2 can be AC signals that have a variable voltage level and that have an opposite phase to each other.

As described above, even when both the first driving voltage VDD and the second driving voltage GB are DC voltages, since the first transmission transistor TXT1 and the second transmission transistor TXT2 are turned on and turned off in different timings, therefore, during the interval in which the first pixel PXL1 is driven, a voltage level in a first driving electrode DE1 of a transducer TRDS included in the first pixel PXL1 can swing between the first driving voltage VDD and the second driving voltage GB.

Meanwhile, during the interval in which the first pixel is driven, a speed at which the voltage level of the first driving electrode of the transducer TRDS included in the first pixel PXL1 swings can correspond to a speed at which the first and second transmission transistors TXT1 and TXT2 included in the first pixel PXL1 are alternately turned on.

Further, there occurs a ΔV difference in voltage between the first driving voltage VDD and the second driving voltage GB, which are DC voltages. Accordingly, during the interval in which the first pixel is driven, the swing width (variation width) of the voltage level in the first driving electrode DE1 of the transducer TRDS included in the first pixel PXL1 becomes the ΔV.

A value of each of the first driving voltage VDD and the second driving voltage GB, which are DC voltages, can be set such that the swing width (variation width) of the voltage level in the first driving electrode DE1 of the transducer TRDS included in the first pixel PXL1 is to be identical to an amplitude ΔV of an AC type driving signal DS supplied to the driving line DRL in the pixel structure of FIG. 2.

Further, the speed at which the first and second transmission transistors TXT1 and TXT2 included in the first pixel PXL1 are alternately turned on can be set to be corresponded to a frequency of the AC type driving signal DS supplied to the driving line DRL in the pixel structure of FIG. 2.

That is, a frequency of each of the first transmission scan signal SC_TX1 of the first transmission transistor TXT1 and the second transmission scan signal SC_TX2 of the second transmission transistor TXT2, included in the first pixel PXL1 can be set to be corresponded to a frequency of the AC type driving signal DS supplied to the driving line DRL in the pixel structure of FIG. 2.

As described above, the pixel structure of FIGS. 14 and 15 in which the DC type first driving voltage is supplied to the driving line DRL can be configured to be driven in a driving environment substantially identical to, or similar to, the pixel structure of FIG. 2 in which the AC type driving signal DS is supplied to the driving line DRL.

As described above, since the DC type of first driving voltage is used, compared with the pixel structure of FIG. 2, it is possible to reduce considerably power consumption, prevent a signal from being delayed, and implement a large area sensor advantageously.

In the pixel structure of FIGS. 14 and 15, the first and second transmission transistors TXT1 and TXT2 may be an identical type of transistors.

For example, as in FIG. 14, the first and second transmission transistors TXT1 and TXT2 may be n-type transistors. For example, as in FIG. 15, the first and second transmission transistors TXT1 and TXT2 may be p-type transistors.

As described above, when the first and second transmission transistors TXT1 and TXT2 are identical type transistors, the first transmission scan signal SC_TX1 applied to the gate node of the first transmission transistor TXT1 and the second transmission scan signal SC_TX2 applied to the gate node of the second transmission transistor TXT2 can be AC signals each having a phase opposite to each other.

When the driving of the first pixel PXL1 in the driving mode is interrupted, the first and second transmission transistors TXT1 and TXT2 may be turned off. To do this, each of the first transmission scan signal SC_TX1 applied to the gate node of the first transmission transistor TXT1 and the second transmission scan signal SC_TX2 applied to the gate node of the second transmission transistor TXT2 has a voltage level at which the first and second transmission transistors TXT1 and TXT2 can be turned off.

In some instances, as long as the first and second transmission transistors TXT1 and TXT2 can repeat turn-on and turn-off at a different timing from each other, the first and second transmission transistors TXT1 and TXT2 can be different types of transistors.

For example, the first transmission transistor TXT1 may be an n-type transistor, and the second transmission transistor TXT2 may be a p-type transistor. As another example, the first transmission transistor TXT1 may be a p-type transistor, and the second transmission transistor TXT2 may be an n-type transistor.

When the first and second transmission transistors TXT1 and TXT2 are different types of transistors, in order for the first and second transmission transistors TXT1 and TXT2 to repeat turn-on and turn-off at different timings, the first transmission scan signal SC_TX1 applied to the gate node of the first transmission transistor TXT1 and the second transmission scan signal SC_TX2 applied to the gate node of the second transmission transistor TXT2 can be AC signals having an identical phase.

When the driving of the first pixel PXL1 in the driving mode is interrupted, the first and second transmission transistors TXT1 and TXT2 may be turned off. To do this, each of the first transmission scan signal SC_TX1 applied to the gate node of the first transmission transistor TXT1 and the second transmission scan signal SC_TX2 applied to the gate node of the second transmission transistor TXT2 has a voltage level at which the first and second transmission transistors TXT1 and TXT2 can be turned off.

Figure 16:
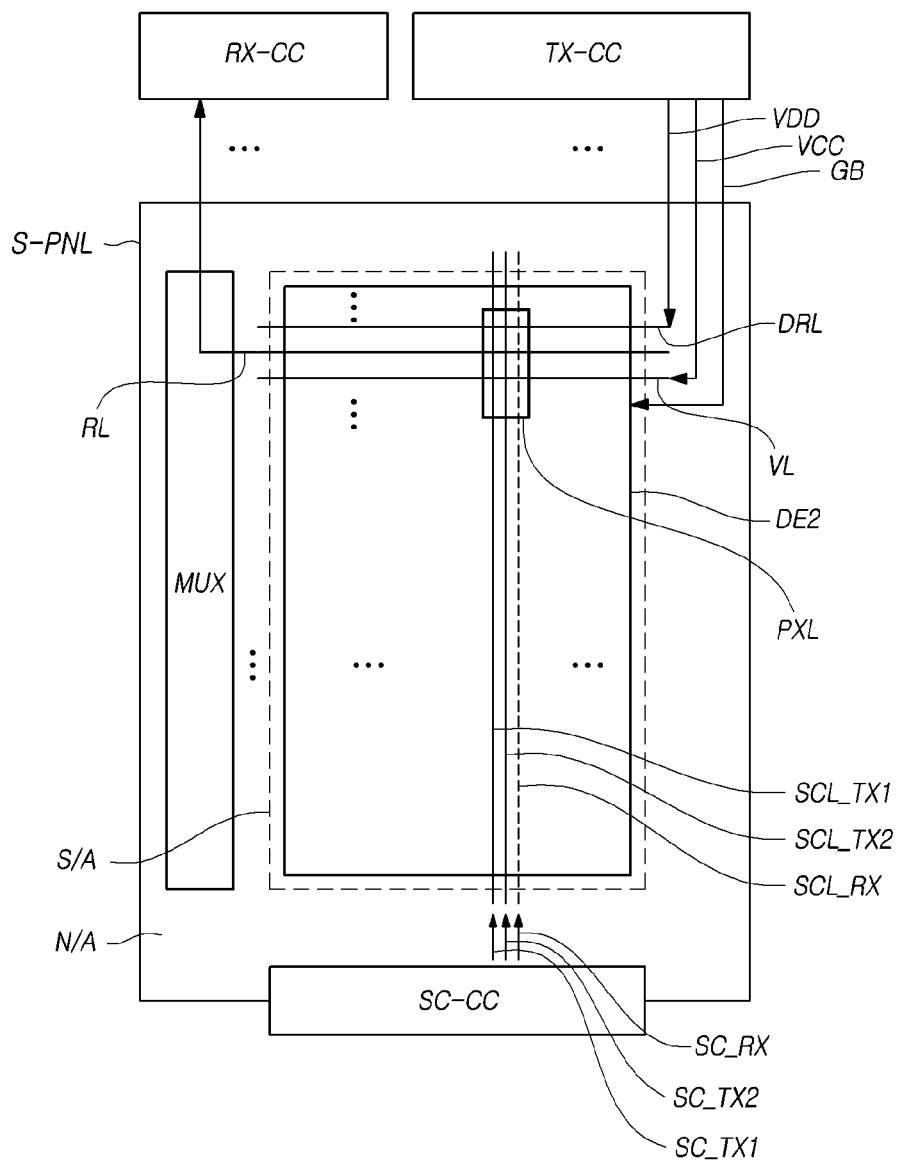
FIG. 16 is a diagram illustrating, when the pixel structure shown in either FIG. 14

FIG. 16 is a diagram illustrating, when the pixel structure shown in either FIG. 14 or FIG. 15 is applied in the sensing device 100, a signal system for operating the sensing device 100 according to embodiments of the present disclosure.

Referring to FIG. 16, when a pixel PXL has the structure in FIG. 14 or 15, a signal system of the sensing device 100 can be substantially identical to the signal system of FIG. 3 for the pixel structure in FIG. 2. Thus, hereinafter, in the following description with respect to FIG. 16, such as illustrated in and described with respect to FIG. 3, some configurations, operations etc. of the embodiments or examples discussed above may not be repeatedly described for convenience of description. That is, even when not discussed in the following description for convenience of description, one or more features, configurations, or structures described above in the embodiments or examples can be equally applied to or combined into each of the embodiments or examples described below. Any full or partial combination of one or more embodiments or examples herein is also part of the present disclosure.

Referring to FIG. 16, in the sensing panel S-PNL, three types of scan lines SCL_TX1, SCL_TX2, and SCL_RX can be arranged to be corresponded to each pixel column. In some embodiments, the three types of scan lines SCL_TX1, SCL_TX2, and SCL_RX can be arranged to be corresponded to each pixel row.

Among the three types of scan lines SCL_TX1, SCL_TX2, and SCL_RX corresponding to each of one or more pixels included in a driving pixel column of a plurality of pixel columns, a first transmission scan signal SC_TX1 applied to a first transmission scan line SCL_TX1 and a second transmission scan signal SC_TX2 applied to a second transmission scan line SCL_TX2 can be AC type signals each having a phase opposite to each other.

Among the three types of scan lines SCL_TX1, SCL_TX2, and SCL_RX corresponding to each of one or more pixels included in a sensing pixel column of the plurality of pixel columns, a first transmission scan signal SC_TX1 applied to a first transmission scan line SCL_TX1 and a second transmission scan signal SC_TX2 applied to a second transmission scan line SCL_TX2 can be DC voltages with a pre-configured level (a turn-off voltage level).

Referring to FIG. 16, a first driving voltage VDD supplied to a driving line DRL can be a DC voltage. The first driving voltage VDD supplied to the driving line DRL can have a voltage value different from a DC type bias voltage GB applied to a second driving electrode DE2.

A difference ($\Delta V=VDD-GB$) in voltage between the first driving voltage VDD supplied to the driving line DRL and the bias voltage GB applied to the second driving electrode DE2 may be set such that a piezoelectric material layer of a transducer TRDS can vibrate, and through this, ultrasonic waves can generate from the piezoelectric material layer.

Figure 17:
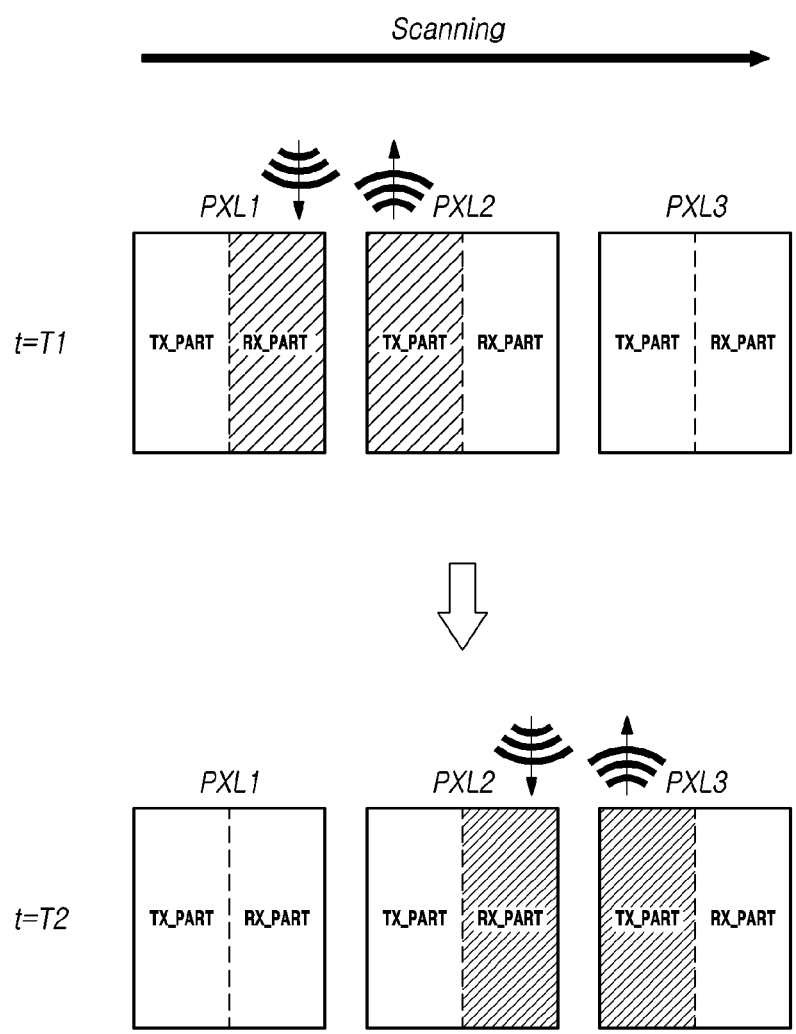
FIGS. 17 and 18 illustrate, when the pixel structure shown in either FIG. 14
Figure 18:
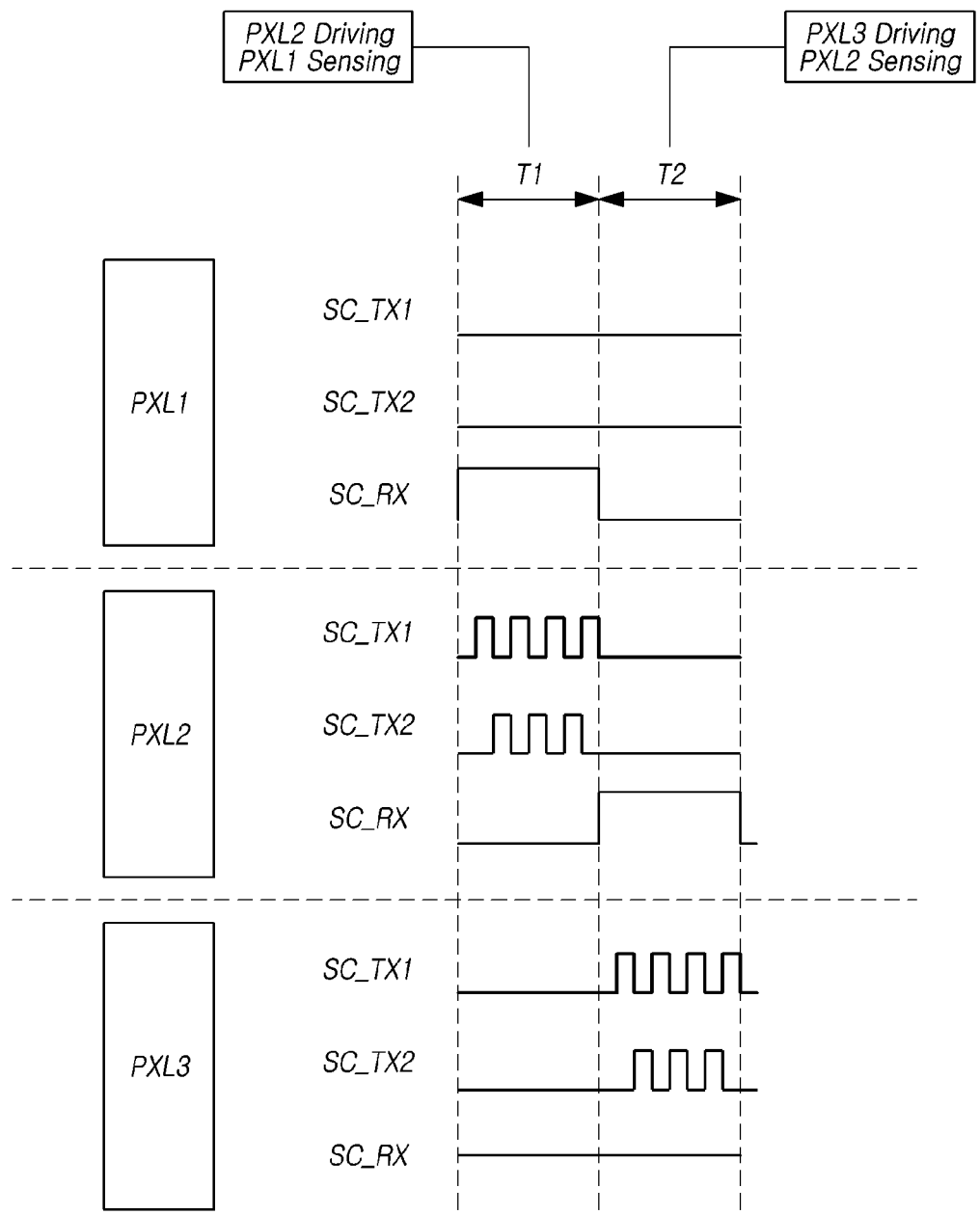

FIGS. 17 and 18 illustrate, when the pixel structure shown in either FIG. 14 or FIG. 15 is applied in the sensing device 100, during a first interval (t=T1) and a second interval (t=T2), scanning and the driving timings of a first pixel PXL1, a second pixel PXL2 and a third pixel PXL3, according to embodiments of the present disclosure.

Referring to FIGS. 17 and 18, the first pixel PXL1, the second pixel PXL2 and the third pixel PXL3 are sequentially disposed adjacently.

FIGS. 17 and 18 illustrate that a scanning direction is a direction away from a multiplexer MUX. Thus, the first pixel PXL1 may be located closest to the multiplexer MUX, and the third pixel PXL3 may be located farthest from the multiplexer MUX, of the first pixel PXL1, the second pixel PXL2 and the third pixel PXL3.

When the scanning direction is a direction toward the multiplexer MUX, the first pixel PXL1 may be located farthest from the multiplexer MUX, and the third pixel PXL3 may be located closest to the multiplexer MUX.

Referring to FIGS. 17 and 18, during the first interval (t=T1), the second pixel PXL2 is a driving pixel D-PXL, and the first pixel PXL1 is a sensing pixel S-PXL.

Referring to FIGS. 17 and 18, during the first interval (t=T1), a first transmission transistor TXT1 and a second transmission transistor TXT2 included in the second pixel PXL2 repeat turn-on and turn-off at respective timings by a first transmission scan signal SC_TX1 and a second transmission scan signal SC_TX2, which are AC type signals each having a phase opposite to each other.

Thus, a first driving voltage VDD and a second driving voltage GB, which are DC voltages with different voltage levels, are repeatedly applied to a driving node Nd corresponding to a first driving electrode DE1 of a transducer TRDS included in the second pixel PXL2 through the first transmission transistor TXT1 and the second transmission transistor TXT2 repeating turn-on and turn-off at different timings from each other. That is, the first driving voltage VDD with a high voltage level is applied to the driving node Nd through the first transmission transistor TXT1, and thereafter, the second driving voltage GB with a low voltage level is applied to the driving node Nd through the second transmission transistor TXT2.

As this operation is repeated, an AC voltage repeatedly swinging between the first driving voltage VDD with the high voltage level and the second driving voltage GB with the low voltage level can be formed in the driving node Nd corresponding to the first driving electrode DE1 of the transducer TRDS included in the second pixel PXL2.

Accordingly, according to a driving operation of the transmission portion TX-PART of the second pixel PXL2, ultrasonic waves are generated from the transducer TRDS, and then the ultrasonic waves can be received to a piezoelectric material layer PIEZO of a transducer TRDS of the first pixel PXL1 adjacent to the transmission portion TX-PART of the second pixel PXL2. A first driving electrode DE1 of the first pixel PXL1 is changed by such ultrasonic waves.

Accordingly, a first reception transistor RXT1 included in the reception portion RX-PART of the first pixel PXL1 can be turned on because the gate node of the first reception transistor RXT1 is electrically connected to the first driving electrode DE1. In addition, a second reception transistor RXT2 included in the reception portion RX-PART of the first pixel PXL1 is turned on by a reception scan signal SC_RX. Accordingly, the sensing circuit S-CC can sense the first pixel PXL1.

Referring to FIGS. 17 and 18, during the second interval (t=T2), the third pixel PXL3 is a driving pixel D-PXL, and the second pixel PXL2 is a sensing pixel S-PXL.

Referring to FIGS. 17 and 18, during the second interval (t=T2), a first transmission transistor TXT1 and a second transmission transistor TXT2 included in the third pixel PXL3 repeat turn-on and turn-off at respective timings by a first transmission scan line SCL_TX1 and a second transmission scan signal SC_TX2, which are AC type signals each having a phase opposite to each other.

Thus, a first driving voltage VDD and a second driving voltage GB, which are DC voltages with different voltage levels, are repeatedly applied to a driving node Nd corresponding to a first driving electrode DE1 of a transducer TRDS included in the third pixel PXL3 through the first transmission transistor TXT1 and the second transmission transistor TXT2 repeating turn-on and turn-off at different timings from each other. That is, the first driving voltage VDD with a high voltage level is applied to the driving node Nd through the first transmission transistor TXT1, and thereafter, the second driving voltage GB with a low voltage level is applied to the driving node Nd through the second transmission transistor TXT2.

As this operation is repeated, an AC voltage repeatedly swinging between the first driving voltage VDD with the high voltage level and the second driving voltage GB with the low voltage level can be formed in the driving node Nd corresponding to the first driving electrode DE1 of the transducer TRDS included in the third pixel PXL3.

Accordingly, according to a driving operation of the transmission portion TX-PART of the third pixel PXL3, ultrasonic waves are generated from the transducer TRDS, and then the ultrasonic waves can be received to a piezoelectric material layer PIEZO of a transducer TRDS of the second pixel PXL2 adjacent to the transmission portion TX-PART of the third pixel PXL3. A first driving electrode DE1 of the second pixel PXL2 is changed by such ultrasonic waves.

Accordingly, a first reception transistor RXT1 included in the reception portion RX-PART of the second pixel PXL2 can be turned on because the gate node of the first reception transistor RXT1 is electrically connected to the first driving electrode DE1. In addition, a second reception transistor RXT2 included in the reception portion RX-PART of the second pixel PXL2 is turned on by a reception scan signal SC_RX. Accordingly, the sensing circuit S-CC can sense the second pixel PXL2.

Figure 19:
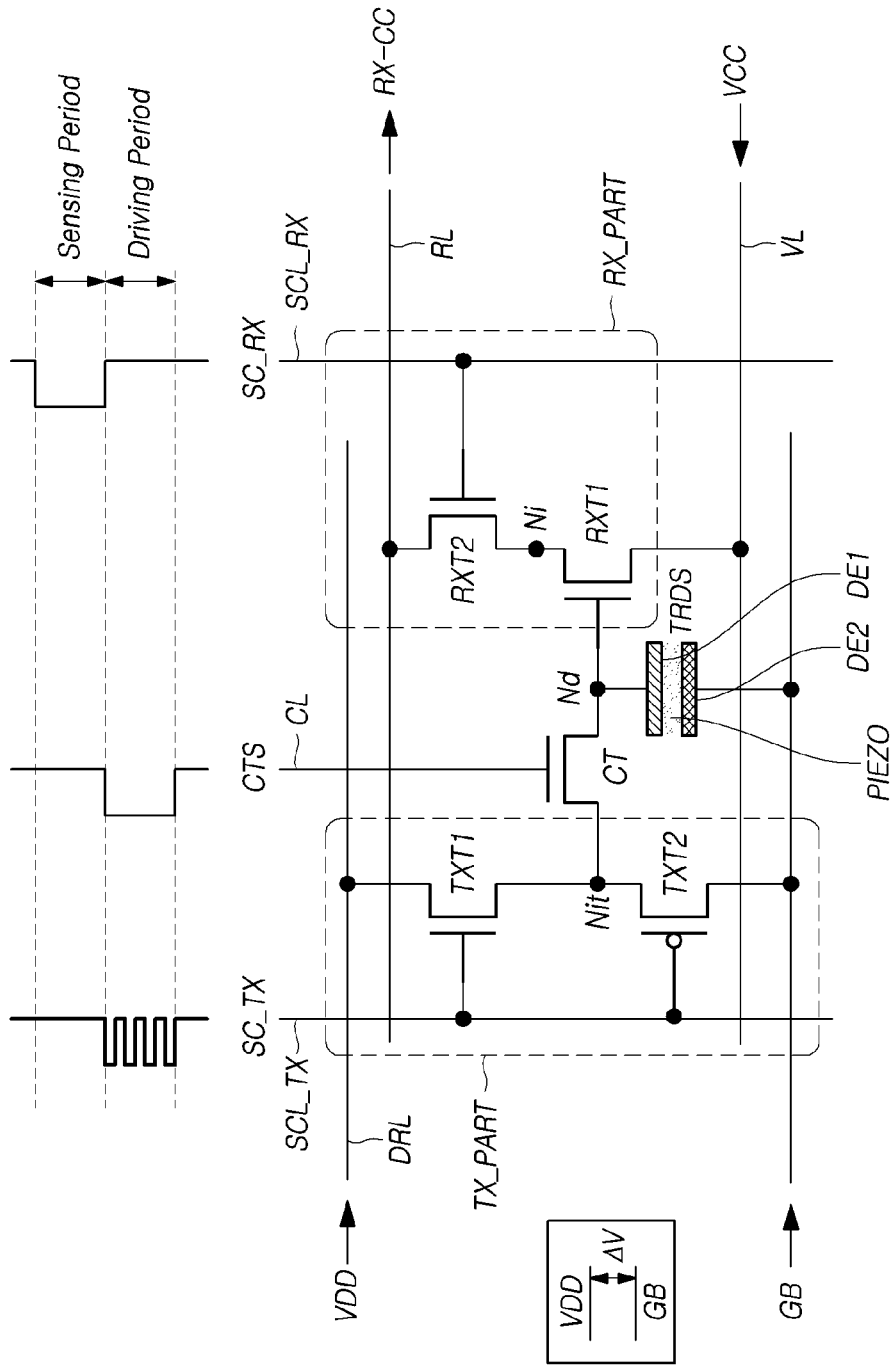
FIG. 19 is a diagram illustrating a further different pixel structure of the sensing device according to embodiments of the present disclosure.

FIG. 19 shows a different pixel structure of the sensing device 100 according to embodiments of the present disclosure.

As described above, the sensing device 100 according to embodiments of the present disclosure can include: a sensing panel S-PNL including a plurality of pixels, and a sensing circuit S-CC that drives one or more first pixels PXL1, which are selected as a driving pixel D-PXL, of the plurality of pixels PXL, and detects a sensing signal from one or more second pixels PXL2 that are adjacent to the one or more first pixel PXL1, and correspond to a sensing pixel S-PXL, of the plurality of pixels PXL.

Each of the plurality of pixels PXL can include a transducer TRDS, a transmission portion TX_PART, a reception portion RX_PART, and the like.

The transducer TRDS can include a first driving electrode DE1, a piezoelectric material layer PIEZO and a second driving electrode DE2. Here, a second driving voltage GB can be applied to the second driving electrode DE2.

The transmission portion TX_PART can include a first transmission transistor TXT1 and a second transmission transistor TXT2.

The first transmission transistor TXT1 and the second transmission transistor TXT2 can be connected between a driving line DRL and a second driving electrode DE2. Here, the driving line DRL is a line to which a first driving voltage VDD is supplied.

The first transmission transistor TXT1 can be electrically connected between a connection node Nit and the driving line DRL. Here, the connection node Nit is a connection point (node) to which the first transmission transistor TXT1 and the second transmission transistor TXT2 are electrically connected.

The second transmission transistor TXT2 can be electrically connected between the connection node Nit and the second driving electrode DE2.

The gate node of the first transmission transistor TXT1 and the gate node of the second transmission transistor TXT2 can be electrically connected to a common transmission scan line SCL_TX. The gate node of the first transmission transistor TXT1 and the gate node of the second transmission transistor TXT2 can be electrically connected to each other.

One of the first transmission transistor TXT1 and the second transmission transistor TXT2 may be an n-type transistor, and the other may be a p-type transistor. Accordingly the first transmission transistor TXT1 and the second transmission transistor TXT2 may be a complementary metal-oxide semiconductor (CMOS).

For example, the first transmission transistor TXT1 may be an n-type transistor, and the second transmission transistor TXT2 may be a p-type transistor. As another example, the first transmission transistor TXT1 may be a p-type transistor, and the second transmission transistor TXT2 may be an n-type transistor.

The reception portion RX_PART can include a first reception transistor RXT1 and a second reception transistor RXT2.

The first reception transistor RXT1 and the second reception transistor RXT2 can be connected between a readout line RL and a power supply line VL to which a power supply voltage VCC is supplied.

The first reception transistor RXT1 can be electrically connected between an intermediate node Ni and the power supply line VL. The first reception transistor RXT1 and the second reception transistor RXT2 can be connected to the intermediate node Ni.

The second reception transistor RXT2 can be controlled by a reception scan signal SC_RX, and electrically connected between the intermediate node Ni and the readout line RL.

Meanwhile, according to the pixel structure of FIG. 19, the one-off operation of each pixel PXL is controlled by a mode control signal CTS, and each pixel PXL can further include a mode control transistor CT electrically connected between the connection node Nit and the first driving electrode DE1.

The mode control signal CTS can be applied to the gate node of the mode control transistor CT through a mode control line CL.

When a corresponding pixel PXL is changed from the driving mode (transmission mode) to the sensing mode (reception mode), the mode control transistor CT electrically floats a driving node Nd such that a voltage of the driving node Nd can be changed by ultrasonic waves.

Thus, when the corresponding pixel PXL is driven in the sensing mode, a piezoelectric material layer PIEZO of a transducer TRDS included in the pixel PXL can vibrate. The vibration of the piezoelectric material layer PIEZO can cause a voltage in the first driving electrode DE1 to be changed; as a result, a normal sensing result can be obtained. That is, the mode control transistor CT causes the corresponding pixel PXL to operate normally as the sensing pixel S-PXL.

During an interval in which a first pixel PXL1 is driven as a driving pixel D-PXL, a second reception transistor RXT2 included in the first pixel PXL1 can be turned off.

During the interval in which the first pixel PXL1 is driven, in the first pixel PXL1, a common transmission scan signal SC_TX applied through the common transmission scan line SCL_TX can be an AC signal with a variable voltage level, and the mode control transistor CT can be turned on.

During the interval in which the first pixel PXL1 is driven as the driving pixel D-PXL, in a second pixel PXL2 corresponding to a sensing pixel S-PXL, a second reception transistor RXT2 can be turned on, and one of a first transmission transistor TXT1 and a second transmission transistor TXT2 in the second pixel PXL2 can be turned on. A mode control transistor CT in the second pixel PXL2 can be turned off.

Meanwhile, before or after the interval in which the first pixel PXL1 is driven as the driving pixel D-PXL, that is, after the interval in which the first pixel PXL1 is driven as the driving pixel D-PXL has been completed, one of the first transmission transistor TXT1 and the second transmission transistor TXT2 in the first pixel PXL1 remains turned on when an interval in which the first pixel PXL1 is sensed as the sensing pixel S-PXL runs.

In other words, since the first transmission transistor TXT1 and the second transmission transistor TXT2 included in the first pixel PXL1 are different types of transistors, and during the interval in which the first pixel PXL1 is operated as the sensing pixel S-PXL, the common transmission scan signal SC_TX with a pre-configured voltage level is applied to the gate nodes of the first transmission transistor TXT1 and the second transmission transistor TXT2 included in the first pixel PXL, one of the first transmission transistor TXT1 and the second transmission transistor TXT2 in the first pixel PXL1 is turned on during the interval in which the first pixel PXL1 is operated as the sensing pixel S-PXL. Thus, one (DC voltage) of the first driving voltage VDD and the second driving voltage GB can be applied to the connection node Nit between the first transmission transistor TXT1 and the second transmission transistor TXT2.

Accordingly, during the interval in which the first pixel PXL1 is driven as the sensing pixel S-PXL, in order for a voltage in the driving node Nd corresponding to the first driving electrode DE1 to be changed by the vibration of the piezoelectric material layer PIEZO of the transducer TRDS included in the first pixel PXL1, a DC voltage (VDD or GB) may be applied to the connection node Nit and not be applied to the driving node Nd.

Accordingly, before or after the interval in which the first pixel PXL1 is driven as the driving pixel D-PXL is completed, the mode control transistor CT remains turned off during the interval in which the first pixel PXL1 is operated as the sensing pixel S-PXL.

Meanwhile, the first driving voltage VDD supplied to the driving line DRL can be a DC voltage.

In the pixel structure of FIG. 2, an AC type driving signal DS is supplied to the driving line DRL; on the contrary, in the pixel structure of FIGS. 14 and 15, the DC type first driving voltage VDD is supplied to the driving line DRL.

The second driving voltage GB applied to the second driving electrode DE2 can be a DC voltage.

The first driving voltage VDD and the second driving voltage GB can be DC voltages each having a different level from the other.

During the interval in which the first pixel PXL1 is driven, in the first pixel PXL1, the first transmission transistor TXT1 can repeat between turn-on and turn-off, and the second transmission transistor TXT2 can repeat between turn-on and turn-off as well.

In this case, the first transmission transistor TXT1 and the second transmission transistor TXT2 are turned on and turned off at a different timing from each other. That is, at an identical timing, a repetition between turn-on and turn-off of the second transmission transistor TXT2 can be opposite to that of the first transmission transistor TXT1.

In other words, when the first transmission transistor TXT1 is turned on, the second transmission transistor TXT2 is turned off, and when the first transmission transistor TXT1 is turned off, the second transmission transistor TXT2 is turned on.

Accordingly, during the interval in which the first pixel PXL1 is driven, in the first pixel PXL1, although an AC signal type common transmission scan signal SC_TX with a variable voltage level is supplied to each gate node of the first transmission transistor TXT1 and the second transmission transistor TXT2 through the common scan line SCL_TX, since the first transmission transistor TXT1 and the second transmission transistor TXT2 are different types, it is possible to provide a driving environment similar to the pixel structure of FIGS. 14 and 15.

As described above, even when both the first driving voltage VDD and the second driving voltage GB are DC voltages, since the first transmission transistor TXT1 and the second transmission transistor TXT2 are turned on and turned off in different timings, therefore, during the interval in which the first pixel PXL1 is driven, a voltage level in the first driving electrode DE1 of the transducer TRDS included in the first pixel PXL1 can swing between the first driving voltage VDD and the second driving voltage GB.

Meanwhile, during the interval in which the first pixel is driven, a speed at which the voltage level of the first driving electrode of the transducer TRDS included in the first pixel PXL1 swings can correspond to a speed at which the first and second transmission transistors TXT1 and TXT2 included in the first pixel PXL1 are alternately turned on.

Further, there occurs a ΔV difference in voltage between the first driving voltage VDD and the second driving voltage GB, which are DC voltages. Accordingly, during the interval in which the first pixel is driven, the swing width (variation width) of the voltage level in the first driving electrode DE1 of the transducer TRDS included in the first pixel PXL1 becomes the ΔV.

A value of each of the first driving voltage VDD and the second driving voltage GB, which are DC voltages, can be set such that the swing width (variation width) of the voltage level in the first driving electrode DE1 of the transducer TRDS included in the first pixel PXL1 is to be identical to an amplitude ΔV of an AC type driving signal DS supplied to the driving line DRL in the pixel structure of FIG. 2.

Further, the speed at which the first and second transmission transistors TXT1 and TXT2 included in the first pixel PXL1 are alternately turned on can be set to be corresponded to a frequency of the AC type driving signal DS supplied to the driving line DRL in the pixel structure of FIG. 2.

That is, a frequency of each of the first transmission scan signal SC_TX1 of the first transmission transistor TXT1 and the second transmission scan signal SC_TX2 of the second transmission transistor TXT2, included in the first pixel PXL1 can be set to be corresponded to a frequency of the AC type driving signal DS supplied to the driving line DRL in the pixel structure of FIG. 2.

As described above, the pixel structure of FIG. 19 in which the DC type first driving voltage is supplied to the driving line DRL can be configured to be driven in a driving environment substantially identical to, or similar to, the pixel structure of FIG. 2 in which the AC type driving signal DS is supplied to the driving line DRL.

As described above, since the DC type of first driving voltage is used, compared with the pixel structure of FIG. 2, it is possible to reduce considerably power consumption, prevent a signal from being delayed, and implement a large area sensor advantageously.

Figure 20:
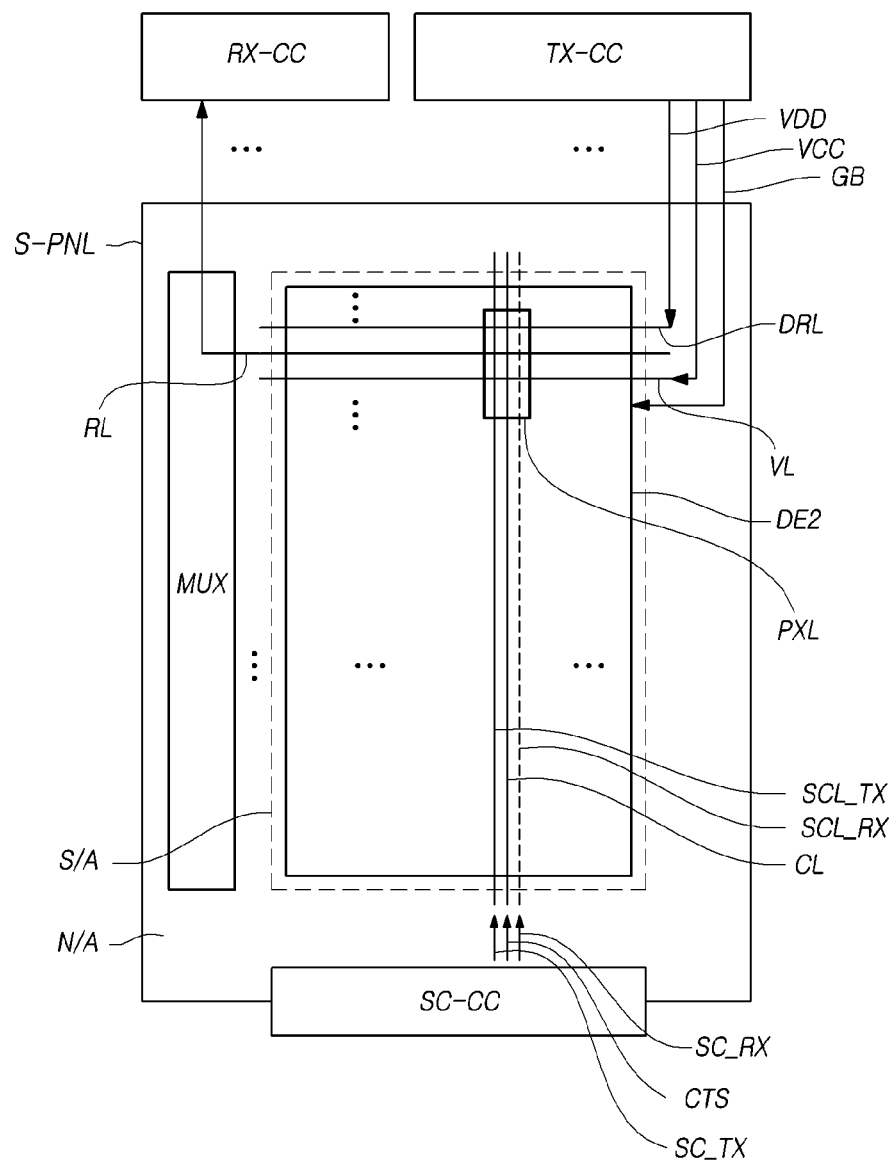
FIG. 20 is a diagram illustrating, when the pixel structure shown in FIG. 19 is applied in the sensing device, a signal system for operating the sensing device according to embodiments of the present disclosure.

FIG. 20 is a diagram illustrating, when the pixel structure of FIG. 19 is applied in the sensing device 100, a signal system for operating the sensing device 100 according to embodiments of the present disclosure.

Referring to FIG. 20, when a pixel PXL has the structure of FIG. 19, a signal system of the sensing device 100 can be substantially identical to the signal system of FIG. 3 for the pixel structure in FIG. 2. Thus, hereinafter, in the following description with respect to FIG. 20, such as illustrated in and described with respect to FIG. 3, some configurations, operations etc. of the embodiments or examples discussed above may not be repeatedly described for convenience of description. That is, even when not discussed in the following description for convenience of description, one or more features, configurations, or structures described above in the embodiments or examples can be equally applied to or combined into each of the embodiments or examples described below. Any full or partial combination of one or more embodiments or examples herein is also part of the present disclosure.

Referring to FIG. 20, in the sensing panel S-PNL, three types of scan lines SCL_TX, CL, and SCL_RX can be arranged to be corresponded to each pixel column. In some embodiments, the three types of scan lines SCL_TX, CL, and SCL_RX can be arranged to be corresponded to each pixel row.

Among the three types of scan lines SCL_TX, CL, and SCL_RX corresponding to each of one or more pixels included in a driving pixel column of a plurality of pixel columns, a common transmission scan signal SC_TX applied to a common transmission scan line SCL_TX can be an AC type signal.

In addition, among the three types of scan lines SCL_TX, CL, and SCL_RX corresponding to each of one or more pixels included in the driving pixel column of the plurality of pixel columns, a mode control signal CTS applied to a mode control line CL can be a voltage applied to the gate node of a mode control transistor CT and enabling the mode control transistor CT to be turned on. The driving node Nd can be electrically connected to the connection node Nit by the turn-on of the mode control transistor CT.

Among the three types of scan lines SCL_TX, CL, and SCL_RX corresponding to each of one or more pixels included in a sensing pixel column of the plurality of pixel columns, a common transmission scan signal SC_TX applied to common transmission scan lines SCL_TX can be a DC voltage with a pre-configured voltage level.

Here, the DC voltage with the pre-configured voltage level can be a voltage applied to the gate node of an n-type transistor, and enabling the n-type transistor to be turned on, or be a voltage applied to the gate node of a p-type transistor, and enabling the p-type transistor to be turned on.

In addition, among the three types of scan lines SCL_TX, CL, and SCL_RX corresponding to each of one or more pixels included in the sensing pixel column of the plurality of pixel columns, a mode control signal CTS applied to a mode control line CL can be a voltage applied to the gate node of a mode control transistor CT and enabling the mode control transistor CT to be turned off. The driving node Nd can be electrically disconnected from the connection node Nit and thus be electrically floated by the turn-off of the mode control transistor CT. In other words, the first driving electrode of the transducer DE1 may be electrically disconnected from the node between the first transmission transistor TXT1 and the second transmission transistor TXT2.

The first driving voltage VDD supplied to the driving line DRL can be a DC voltage. The first driving voltage VDD supplied to the driving line DRL can have a voltage value different from a DC type bias voltage GB applied to a second driving electrode DE2.

A difference ($\Delta V=VDD-GB$) in voltage between the first driving voltage VDD supplied to the driving line DRL and the bias voltage GB applied to the second driving electrode DE2 may be set such that a piezoelectric material layer of a transducer TRDS can vibrate, and through this, ultrasonic waves can generate from the piezoelectric material layer.

Figure 21:
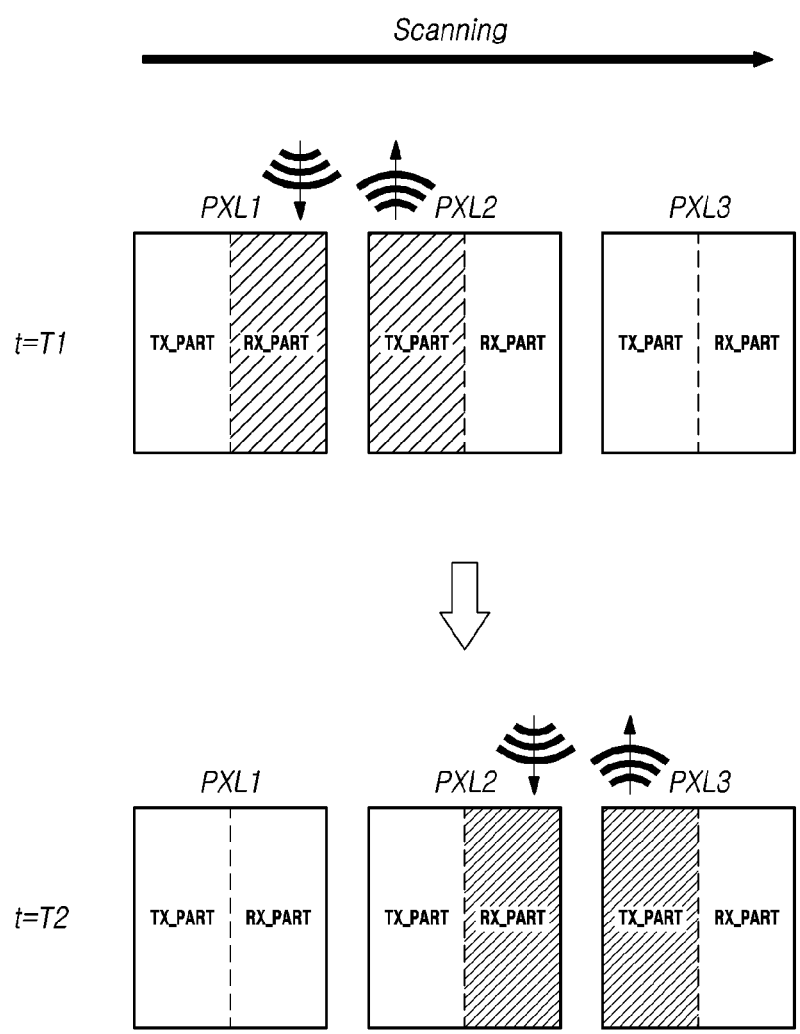
FIGS. 21 and 22 illustrate, when the pixel structure shown in FIG. 19 is applied in the sensing device, during a first interval and a second interval, the scanning and the driving timing of a first pixel, a second pixel and a third pixel, according to embodiments of the present disclosure.
Figure 22:
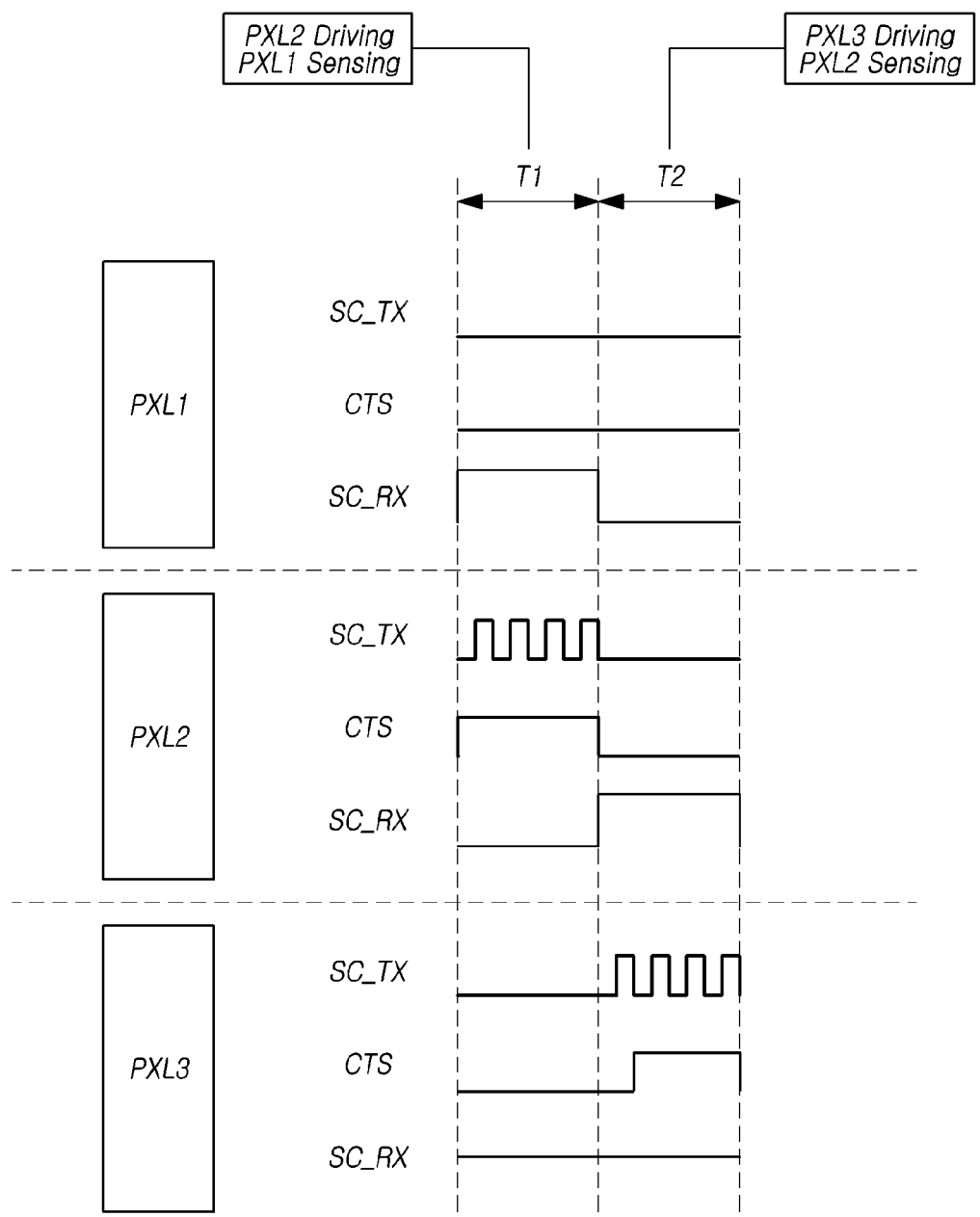

FIGS. 21 and 22 illustrate, when the pixel structure shown of FIG. 19 is applied in the sensing device 100, during a first interval (t=T1) and a second interval (t=T2), scanning and driving timings of a first pixel PXL1, a second pixel PXL2 and a third pixel PXL3, according to embodiments of the present disclosure.

Referring to FIGS. 21 and 22, the first pixel PXL1, the second pixel PXL2 and the third pixel PXL3 are sequentially disposed adjacently.

FIGS. 21 and 22 show that a scanning direction is a direction away from the multiplexer MUX. Thus, the first pixel PXL1 may be located closest to the multiplexer MUX, and the third pixel PXL3 may be located farthest from the multiplexer MUX, of the first pixel PXL1, the second pixel PXL2 and the third pixel PXL3.

When the scanning direction is a direction toward the multiplexer MUX, the first pixel PXL1 may be located farthest from the multiplexer MUX, and the third pixel PXL3 may be located closest to the multiplexer MUX.

Referring to FIGS. 21 and 22, during the first interval (t=T1), the second pixel PXL2 is a driving pixel D-PXL, and the first pixel PXL1 is a sensing pixel S-PXL.

Referring to FIGS. 21 and 22, during the first interval (t=T1), an AC type common transmission scan signal SC_TX is applied to the gate nodes of a first transmission transistor TXT1 and a second transmission transistor TXT2, which are included in the second pixel PXL2, and different types (a n-type and a p-type).

Accordingly, during the first interval (t=T1), the first and second transmission transistors TXT1 and TXT2 included in the second pixel PXL2 operated as the driving pixel D-PXL repeat turn-on and turn-off at different timings. In addition, during the first interval (t=T1), a mode control transistor CT included in the second pixel PXL2 operated as the driving pixel D-PXL is turned on by a mode control signal CTS.

Thus, a first driving voltage VDD and a second driving voltage GB, which are DC voltages with different voltage levels, are repeatedly applied to a driving node Nd corresponding to a first driving electrode DE1 of a transducer TRDS included in the second pixel PXL2 through the first transmission transistor TXT1 and the second transmission transistor TXT2 repeating turn-on and turn-off at different timings from each other. That is, the first driving voltage VDD with a high voltage level is applied to the driving node Nd through the first transmission transistor TXT1, and thereafter, the second driving voltage GB with a low voltage level is applied to the driving node Nd through the second transmission transistor TXT2.

As this operation is repeated, an AC voltage repeatedly swinging between the first driving voltage VDD with the high voltage level and the second driving voltage GB with the low voltage level can be formed in the driving node Nd corresponding to the first driving electrode DE1 of the transducer TRDS included in the second pixel PXL2.

Accordingly, according to a driving operation of the transmission portion TX-PART of the second pixel PXL2, ultrasonic waves are generated from the transducer TRDS, and then the ultrasonic waves can be received to a piezoelectric material layer PIEZO of a transducer TRDS of the first pixel PXL1 adjacent to the transmission portion TX-PART of the second pixel PXL2.

At this time, a mode control transistor CT of the first pixel PXL1 becomes turned off by a mode control signal CTS, in order for a voltage in the first driving electrode DE1 of the transducer TRDS of the first pixel PXL1 to be changed by the vibration of the piezoelectric material layer PIEZO caused by the ultrasonic waves.

A first reception transistor RXT1 included in the reception portion RX-PART of the first pixel PXL1 can be turned on because the gate node of first reception transistor RXT1 included in the reception portion RX-PART of the first pixel PXL1 is electrically connected to the first driving electrode DE1, the voltage of which has been changed by the ultrasonic waves. In addition, a second reception transistor RXT2 included in the reception portion RX-PART of the first pixel PXL1 is turned on by a reception scan signal SC_RX. Thus, the sensing circuit S-CC can detect a signal through a readout line RL corresponding to the first pixel PXL1.

Referring to FIGS. 21 and 22, during the second interval (t=T2), the third pixel PXL3 is a driving pixel D-PXL, and the second pixel PXL2 is a sensing pixel S-PXL.

Referring to FIGS. 21 and 22, during the second interval (t=T2), an AC type common transmission scan signal SC_TX is applied to the gate nodes of a first transmission transistor TXT1 and a second transmission transistor TXT2, which are included in the third pixel PXL3, and different types (a n-type and a p-type).

Accordingly, during the second interval (t=T2), the first and second transmission transistors TXT1 and TXT2 included in the third pixel PXL3 operated as the driving pixel D-PXL repeat turn-on and turn-off at different timings. In addition, during the second interval (t=T2), a mode control transistor CT included in the third pixel PXL3 operated as the driving pixel D-PXL is turned on by a mode control signal CTS.

Thus, a first driving voltage VDD and a second driving voltage GB, which are DC voltages with different voltage levels, are repeatedly applied to a driving node Nd corresponding to a first driving electrode DE1 of a transducer TRDS included in the third pixel PXL3 through the first transmission transistor TXT1 and the second transmission transistor TXT2 repeating turn-on and turn-off at different timings from each other. That is, the first driving voltage VDD with a high voltage level is applied to the driving node Nd through the first transmission transistor TXT1, and thereafter, the second driving voltage GB with a low voltage level is applied to the driving node Nd through the second transmission transistor TXT2.

As this operation is repeated, an AC voltage repeatedly swinging between the first driving voltage VDD with the high voltage level and the second driving voltage GB with the low voltage level can be formed in the driving node Nd corresponding to the first driving electrode DE1 of the transducer TRDS included in the third pixel PXL3.

Accordingly, according to a driving operation of the transmission portion TX-PART of the third pixel PXL3, ultrasonic waves are generated from the transducer TRDS, and then the ultrasonic waves can be received to a piezoelectric material layer PIEZO of a transducer TRDS of the second pixel PXL2 adjacent to the transmission portion TX-PART of the third pixel PXL3.

At this time, a mode control transistor CT of the second pixel PXL2 becomes turned off by a mode control signal CTS, in order for a voltage in the first driving electrode DE1 of the transducer TRDS of the second pixel PXL2 to be changed by the vibration of the piezoelectric material layer PIEZO caused by the ultrasonic waves.

A first reception transistor RXT1 included in the reception portion RX-PART of the second pixel PXL2 can be turned on because the gate node of first reception transistor RXT1 included in the reception portion RX-PART of the second pixel PXL2 is electrically connected to the first driving electrode DE1, the voltage of which has been changed by the ultrasonic waves. In addition, a second reception transistor RXT2 included in the reception portion RX-PART of the second pixel PXL2 is turned on by a reception scan signal SC_RX. Thus, the sensing circuit S-CC can detect a signal through a readout line RL corresponding to the second pixel PXL2.

FIG. 23 illustrates, when a pixel of the sensing device 100 includes two transmission transistors TXT1 and TXT2 in the transmission portion TX_PART as the pixel structures in FIGS. 14, 15, and 19, a voltage formed in a first driving electrode DE1 of a transducer TRDS according to embodiments of the present disclosure.

Referring to FIG. 23, when a pixel includes two transmission transistors TXT1 and TXT2 in the transmission portion TX_PART as in the pixel structures in FIGS. 14, 15, and 19, since a first driving voltage VDD and a second driving voltage GB, which are DC voltages, are alternately applied, a first driving electrode DE1 of a transducer TRDS has a form of voltage swinging with a certain difference (ΔV=VDD−GB) in voltage between the first driving voltage VDD and the second driving voltage GB.

Thus, the voltage formed in the first driving electrode DE1 can correspond to at least one of an amplitude ΔV, a frequency, and a phase etc. of the driving signal DS applied to the first driving electrode DE1 through the driving line DRL in the pixel structure of FIG. 2.

Figure 24:
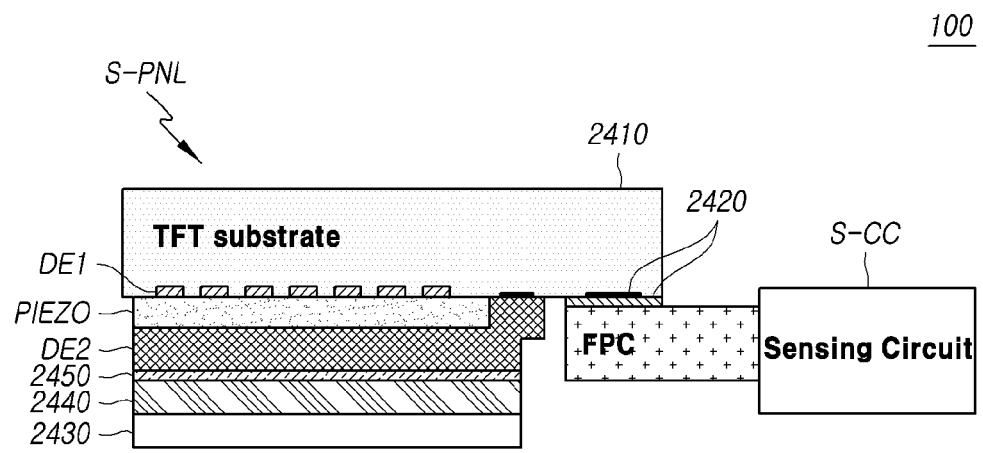
FIG. 24 illustrates an example implementation of the sensing device according to embodiments of the present disclosure.

FIG. 24 shows implementation of the sensing device 100 according to embodiments of the present disclosure.

Referring to FIG. 24, the sensing device 100 in accordance with embodiments of the present disclosure can include a sensing panel S-PNL and a sensing circuit S-CC etc.

The sensing panel S-PNL can include a thin film transistor (TFT) substrate 2410 on which transistors included in the pixels of FIGS. 2, 14, 15 and 16 are disposed, a piezoelectric material layer PIEZO disposed under the substrate 2410, and a second driving electrode DE2 located under the piezoelectric material layer PIEZO.

The TFT substrate 2410 can include a first driving electrode DE1 included in each pixel PXL.

The second driving electrode DE2 can be disposed using a method of coating silver ink, or be disposed to cover the whole area of the piezoelectric material layer PIEZO or in a pre-configured pattern.

The sensing panel S-PNL can further include a reflective layer 2440 adhered to a lower portion of the second driving electrode DE2 through an adhesive layer 2450. The reflective layer 2440 can be formed of a metal, such as copper or the like, and can perform a function of reflecting ultrasonic waves reflected from a fingerprint to the TFT substrate 2410.

The sensing panel S-PNL can further include a passivation layer located under the reflective layer 2440. The reflective layer 2440 can be formed of polyimid PI. The passivation layer 2430 can cap and protect pixels PXL of the sensing panel S-PNL and the reflective layer 2440.

Several signals and voltages for driving and sensing pixels PXL can be supplied from the sensing circuit S-CC.

At least one pad 2420 of each of the sensing panel S-PNL and the sensing circuit S-CC can be electrically connected through a flexible printed circuit FPC.

Figure 25:
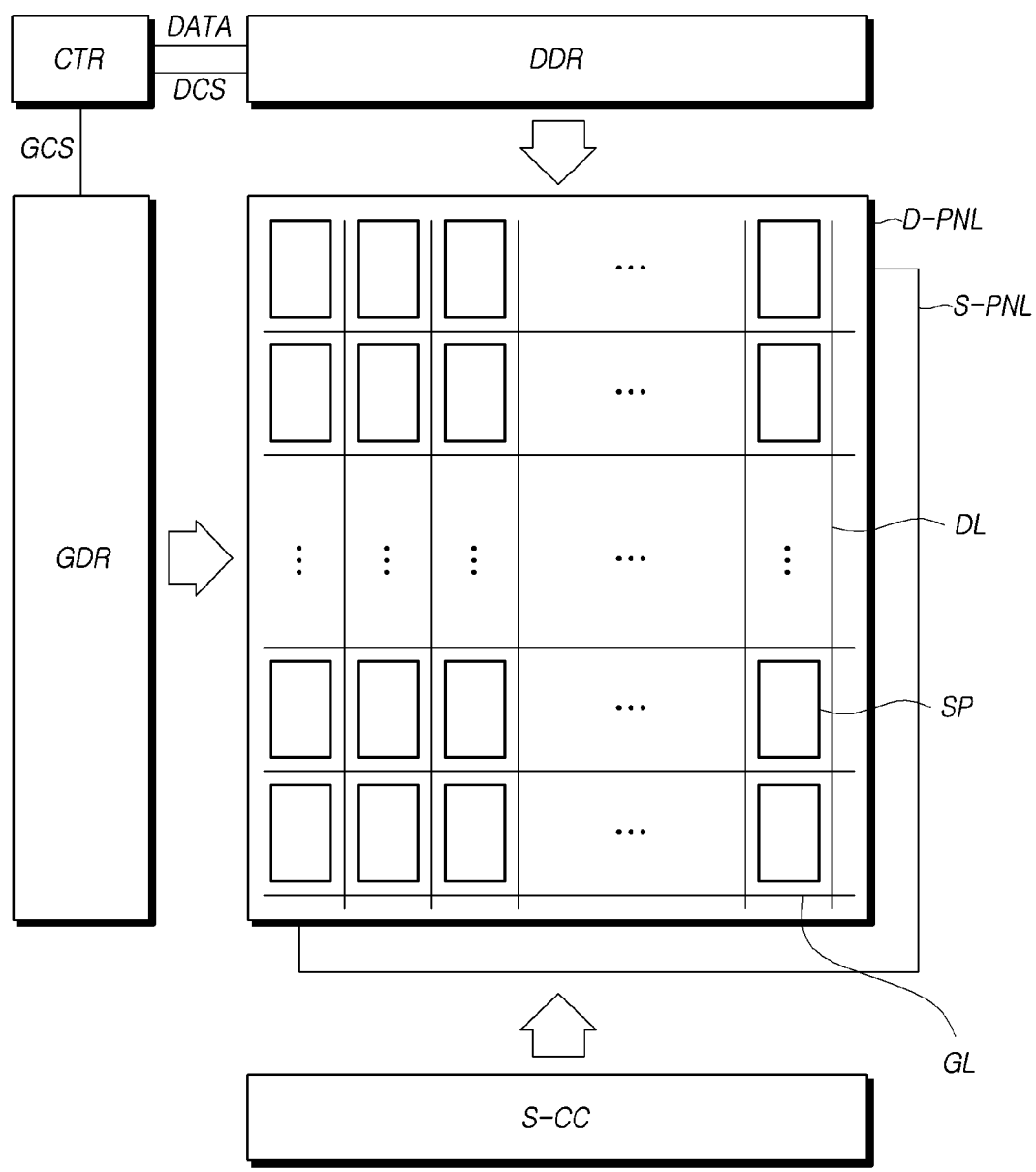
FIG. 25 is a diagram illustrating a system configuration of a display device according to embodiments of the present disclosure.
Figure 26:
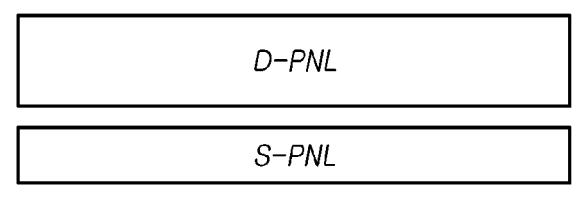
Figure 27:
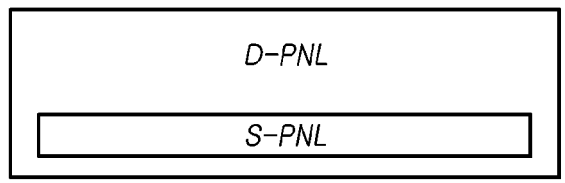
FIG. 27 illustrates a sensing panel located inside the display panel in the display device according to embodiments of the present disclosure.

FIG. 25 is a diagram illustrating a system configuration of a display device according to embodiments of the present disclosure. FIGS. 26 and 27 illustrate sensing panels S-PNL included inside and outside of display panels D-PNL in the display device according to embodiments of the present disclosure.

Referring to FIG. 25, the display device in accordance with embodiments of the present disclosure can include a display panel D-PNL, display driving circuits DDR, GDR and CTR, a sensing panel S-PNL and a sensing circuit S-CC.

The display panel D-PNL is a panel for displaying an image, and can include a plurality of data lines DL, a plurality of gate lines GL and a plurality of subpixels SP.

The display panel D-PNL can be various types of panel, such as, a liquid crystal display (LCD) panel, an organic light emitting diode (OLED) panel, or the like.

Types of signal lines disposed in the display panel D-PNL may differ according a subpixel structure, a panel type (an LCD panel, an OLED panel, etc.), or the like. In addition, the signal line herein may include an electrode to which a signal is applied.

The display panel D-PNL can include an active area in which an image is displayed, and a non-active area which corresponds to an edge area of the display panel D-PNL and in which an image is not displayed.

The plurality of subpixels SP is arranged for displaying images in the active area.

At least one pad to which a data driver DDR is electrically connected can be disposed in the non-active area, and a plurality of data link lines can be disposed to connect between the pad and the plurality of data lines DL. Here, the plurality of data link lines may be parts of the plurality of data lines DL extending to the non-active area, or may be separate patterns electrically connected to the plurality of data lines DL.

In addition, gate-driving-related lines can be disposed in the non-active area for delivering a voltage (signal) for driving at least one gate of at least one transistor for driving at least one subpixel to a gate driver GDR through the pad to which the data driver DDR is electrically connected. For example, the gate-driving-related lines may include a clock line for delivering clock signals, a gate voltage line for delivering gate voltages VGH and VGL, a gate driving control signal line for delivering various control signals for generating scan signals, or the like. The gate-driving-related lines are arranged in the non-active area, unlike the gate lines GL arranged in the active area A/A.

One or more display driving circuits DDR, GDR and CTR can be used for driving the display panel D-PNL, and include the data driver DDR for driving the plurality of data lines DL, the gate driver GDR for driving the plurality of gate lines GL, the controller CTR controlling the display driver DDR and the gate driver GDR.

The data driver DDR can drive the plurality of data lines DL by providing data voltages to the plurality of data lines DL.

The gate driver GDR can drive the plurality of gate lines GL by providing scan signals to the plurality of gate lines GL.

The controller CTR can provide various control signals DCS and GCS for driving the data driver DDR and the gate driver GDR, and control driving operations of the data driver DDR and the gate driver GDR. In addition, the controller CTR can supply image data DATA to the data driver DDR.

The controller CTR starts scanning operation according to a timing processed in each frame, converts image data input from other devices or image providing sources to a data signal form used in the data driver DDR and then outputs image data DATA obtained from the converting, and controls the driving of at least one data line at a certain time according to the scanning of at least one pixel of one pixel row (or column).

The controller CTR generates various control signals DCS and GCS for controlling the data driver DDR and the gate driver GDR, and outputs the generated signals to the data driver DDR and the gate driver GDR.

For example, to control the gate driver GDR, the controller CTR outputs various gate control signals GCS including a gate start pulse GSP, a gate shift clock GSC, a gate output enable signal GOE, or the like.

In addition, to control data driver DDR, the controller CTR outputs various data control signals DCS including a source start pulse SSP, a source sampling clock SSC, a source output enable signal SOE, or the like.

The controller may be a timing controller used in the typical display technology or a control apparatus/device capable of additionally performing other control functionalities in addition to the typical function of the timing controller.

The controller CTR may be implemented as a separate unit from the data driver DDR, or integrated with the data driver DDR and implemented as an integrated circuit.

The data driver DDR receives image data DATA from the controller CTR, and provides data voltages to the plurality of data lines DL. Thus, the data driver DDR drives the plurality of data lines DL. Herein, the data driver DDR may also be referred to as a source driver.

The data driver DDR can transmit various signals to and/or receive them from the controller CTR through various interfaces.

The gate driver GDR sequentially drives the plurality of gate lines GL by sequentially providing scan signals to the plurality of gate lines GL. Herein, the gate driver GDR may also be referred to as a scan driver.

According to the control of the controller CTR, the gate driver circuit GDR sequentially provides a scan signal with a turn-on voltage level or a turn-off voltage level to the plurality of gate lines GL.

When a specific gate line is asserted by a scan signal from the gate driver GDR, the data driver DDR converts image data DATA received from the controller CTR into analog data voltages and provides the obtained analog data voltages to the plurality of data lines DL.

The data driver DDR may be located on, but not limited to, only one side (e.g., an upper side or a lower side) of the display panel D-PNL, or in some embodiments, be located on, but not limited to, two sides (e.g., an upper side and a lower side) of the display panel D-PNL according to driving schemes, panel design schemes, or the like.

The gate driver GDR may be located on, but not limited to, only one side (e.g., a left side or a right side) of the display panel D-PNL, or in some embodiments, be located on, but not limited to, two sides (e.g., a left side and a right side) of the display panel D-PNL according to driving schemes, panel design schemes, or the like.

The data driver DDR can be implemented by including one or more source driver integrated circuits SDIC.

Each source driver integrated circuits SDIC may include a shift register, a latch circuit, a digital to analog converter DAC, an output buffer, or the like. In some embodiments, the data driver DDR may further include one or more analog to digital converters ADC.

Each source driver integrated circuit SDIC can be connected to a pad, such as a bonding pad, of the display panel D-PNL in a tape automated bonding TAB type or a chip on glass (COG) type, or be directly disposed on the display panel D-PNL. In some embodiments, each source driver integrated circuit SDIC may be integrated and disposed on the display panel D-PNL. In addition, each source driver integrated circuit SDIC may be implemented in a chip on film (COF) type. In this case, each source driver integrated circuit SDIC can be mounted on a circuit film and electrically connected to the data lines DL of the display panel D-PNL through the circuit film.

The gate driver GDR can include a plurality gate driving circuits GDC. Here, the plurality of gate driving circuits GDC can correspond to the plurality of gate lines.

Each gate driving circuit GDC can include a shift register, a level shifter, and the like.

Each gate driving circuit GDC can be connected to the pad, such as a bonding pad, of the display panel D-PNL in a tape automated bonding (TAB) type or a chip on glass (COG) type. In addition, each gate driving circuit GDC may be implemented in a chip on film (COF) type. In this case, each gate driver integrated circuit SDIC can be mounted on a circuit film and electrically connected to the gate lines GL of the display panel D-PNL through the circuit film. In addition, each gate driving circuit GDC may be integrated into the display panel D-PNL in a gate in panel (GIP) type. That is, each gate driving circuit GDC may be directly formed in the display panel D-PNL.

A plurality of pixels PXL can be disposed on the sensing panel S-PNL.

The sensing circuit S-CC can drive and sense the sensing panel S-PNL.

Each of the plurality of pixels PXL disposed on the sensing panel S-PNL can have one of the pixel structures in FIGS. 2, 14, 15 and 19.

When each of the plurality of pixels PXL disposed on the sensing panel S-PNL has one of the pixel structures in FIGS. 2, 14, 15 and 19, each of the plurality of pixels PXL can include a transducer TRDS including a first driving electrode DE1, a piezoelectric material layer PIEZO, and a second driving electrode DE2, a first transmission transistor TXT1 and a second transmission transistor TXT2 which are electrically connected between a driving line DRL to which a first driving voltage VDD is supplied and the second driving electrode DE2 to which a second driving voltage GB is supplied, and a first reception transistor RXT1 and a second reception transistor RXT2 which are electrically connected between a read-out line RL and a power supply line VL to which a power supply voltage VCC is supplied.

The first transmission TXT1 can be electrically connected between the driving line DRL and a connection node Nit to which the first transistor TXT1 and the second transistor TXT2 are electrically connected.

The second transmission transistor TXT2 can be electrically connected between the connection node Nit and the second driving electrode DE2.

The first reception RXT1 can be electrically connected between the power supply line VL and an intermediate node Ni to which the first transistor RXT1 and the second transistor RXT2 are connected.

The second reception transistor RXT2 can be controlled by a reception scan signal SC_RX, and electrically connected between the intermediate node Ni and the readout line RL.

The first driving voltage VDD and the second driving voltage GB can be DC voltages each having a different level from the other.

During an interval in which the first pixel PXL1 is driven, i.e. as a driving pixel D-PXL, in the first pixel PXL1, the first transmission transistor TXT1 can repeat turn-on and turn-off, and the second transmission transistor TXT2 can repeat turn-on and turn-off opposite to those of the first transmission transistor.

During the interval in which the first pixel PXL1 is driven, a voltage level in the first driving electrode DE1 of the transducer TRDS included in the first pixel PXL1 can swing between the first driving voltage VDD and the second driving voltage GB.

As illustrated in FIGS. 14 and 15, the first and second transmission transistors TXT1 and TXT2 can be an identical type of transistors, e.g., n-type transistors or p-type transistors.

In this case, the gate node of each of the first transmission transistor TXT1 and the second transmission transistor TXT2 can be electrically connected to a different scan lines SCL_TX1 and SCL_TX2 from each other.

As illustrated in FIG. 19, One of the first transmission transistor TXT1 and the second transmission transistor TXT2 can be an n-type transistor, and the other can be a p-type transistor.

In this case, the gate node of each of the first transmission transistor TXT1 and the second transmission transistor TXT2 can be electrically connected to an identical (e.g., same) scan line SCL_TX. Further, a mode control transistor CT can be electrically connected between the first driving electrode DE1 and the connection node Nit to which the first transistor TXT1 and the second transistor TXT2 are connected.

The mode control transistor CT can be turned on until the first transmission transistor TXT1 and the second transmission transistor TXT2 are alternately turned on. The mode control transistor CT can be turned off when only one of the first transmission transistor TXT1 and the second transmission transistor TXT2 remains turned on.

Meanwhile, biometric information, such as a fingerprint etc. or a touch on display panel D-PNL can be sensed based on sensing data obtained from the sensing panel S-PNL.

The sensing circuit S-CC can obtain results from fingerprint sensing, such as a fingerprint image, or the like. As another example, a processor can receive the sensing data obtained by the sensing circuit S-CC, and using the received data, obtain results of fingerprint sensing, such as a fingerprint image, or the like.

The sensing circuit S-CC may be implemented separately from the display driving circuit, or included in the display driving circuit. For example, the sensing circuit S-CC can be included in the data driver DDR. The sensing circuit S-CC and the data driver DDR are integrated into one component, and implemented as one driving chip.

As illustrated in FIG. 26, the sensing panel S-PNL can be located outside of display panels D-PNL. For example, the sensing panel S-PNL can be attached in a lower portion of the display panel D-PNL.

The sensing panel S-PNL can have a size corresponding to or similar to the display panel D-PNL. As another example, the sensing panel S-PNL can have a smaller size than the display panel D-PNL. The sensing panel S-PNL can be attached on a specific location of a lower portion of the display panel D-PNL.

As illustrated in FIG. 27, the sensing panel S-PNL can be located inside of display panels D-PNL.

As described above, in accordance with embodiments of the present disclosure, it is possible to provide a sensing device having high sensing accuracy and high security and a display device including the sensing device.

In addition, in accordance with embodiments of the present disclosure, it is possible to provide a sensing device 100 having a pixel structure more advantageous for downsizing, as in FIGS. 2, 14, 15 and 19, a pixel structure more advantageous for large area sensing, as in FIGS. 14, 15 and 19, and a display device having the sensing device.

In addition, in accordance with embodiments of the present disclosure, it is possible to provide a sensing device 100 having a pixel structure more advantageous for implementing a large area sensor and a display device including the sensing device.

Further, in accordance with embodiments of the present disclosure, it is possible to provide a sensing device 100 capable of reducing power consumption when sensing operation is performed and a display device including the sensing device.

In addition, in accordance with embodiments of the present disclosure, it is possible to provide a sensing device 100 that is not affected by a delay of a signal used for driving when sensing operation is performed and a display device including the sensing device.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to one or more other additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The scope of protection of the present disclosure should be construed based on the following claims, and all technical ideas within the scope of equivalents thereof should be construed as being included within the scope of the present disclosure.

What is claimed is:

1. A sensing device comprising:
   a sensing panel including a plurality of pixels; and
   a sensing circuit driving at least one first pixel selected from the plurality of pixels, and detecting a sensing signal from at least one second pixel adjacent to the at least one first pixel of the plurality of pixels,
   wherein each of the plurality of pixels comprises:
      a transducer including a first driving electrode, a piezoelectric material layer, and a second driving electrode;
      a first transmission transistor and a second transmission transistor electrically connected between a driving line to which a first driving voltage is supplied and the second driving electrode of the transducer to which a second driving voltage is supplied; and
      a first reception transistor and a second reception transistor electrically connected between a readout line and a power supply line to which a power supply voltage is supplied,
   wherein the first transmission transistor is electrically connected between the driving line and a connection node between the first transmission transistor and the second transmission transistor,
   wherein the second transmission transistor is electrically connected between the connection node and the second driving electrode,
   wherein the first reception transistor is electrically connected between the power supply line and an intermediate node corresponding to a connection point between the first reception transistor and the second reception transistor,
   wherein the second reception transistor is controlled by a reception scan signal and electrically connected between the intermediate node and the readout line,
   wherein the first driving voltage and the second driving voltage are DC voltages each having a different level from each other, and
   wherein during an interval in which the at least one first pixel is driven, in the at least one first pixel, the first transmission transistor repeats turn-on and turn-off, and the second transmission transistor repeats turn-on and turn-off opposite to those of the first transmission transistor.

2. The sensing device according to claim 1, wherein during the interval in which the at least one first pixel is driven, the first driving electrode of the transducer included in the at least one first pixel is electrically connected the connection node, and a level of a voltage in the first driving electrode of the transducer included in the at least one first pixel swings between the first driving voltage and the second driving voltage.

3. The sensing device according to claim 2, wherein during the interval in which the at least one first pixel is driven, a speed at which the voltage level in the first driving electrode of the transducer included in the at least one first pixel swings corresponds to a speed at which the first and second transmission transistors included in the at least one first pixel are alternately turned on.

4. The sensing device according to claim 1, wherein during an interval in which the at least one first pixel is driven and the at least one second pixel is sensed, the second reception transistor included in the at least one first pixel is turned off, and in the at least one second pixel, the second reception transistor is turned on and both the first transmission transistor and the second transmission transistor are turned off.

5. The sensing device according to claim 1, wherein during an interval in which the at least one first pixel is driven and the at least one second pixel is sensed, the second reception transistor included in the at least one first pixel is turned off, and in the at least one second pixel, the second reception transistor in the at least one second pixel is turned on and one of the first transmission transistor and the second transmission transistor is turned on.

6. The sensing device according to claim 1, wherein a gate node of the first transmission transistor is electrically connected to a first transmission scan line, and a gate node of the second transmission transistor is electrically connected to a second transmission scan line different from the first transmission scan line.

7. The sensing device according to claim 6, wherein during the interval in which the at least one first pixel is driven, in the at least one first pixel, a first transmission scan signal applied to a gate node of the first transmission transistor through the first transmission scan line and a second transmission scan signal applied to a gate node of the second transmission transistor through the second transmission scan line are AC signals that have a variable voltage level and that have an opposite phase to each other.

8. The sensing device according to claim 6, wherein both the first transmission transistor and the second transmission transistor are n-type transistors or p-type transistors.

9. The sensing device according to claim 1, wherein a gate node of the first transmission transistor and a gate node of the second transmission transistor are electrically connected to a common transmission scan line,
   wherein one of the first transmission transistor and the second transmission transistor is an n-type transistor, and another one of the first transmission transistor and the second transmission transistor is a p-type transistor, and
   wherein during the interval in which the at least one first pixel is driven, in the at least one first pixel, a common transmission scan signal applied through the common transmission scan line is an AC signal with a variable voltage level.

10. The sensing device according to claim 9, wherein each of the plurality of pixels further comprise a mode control transistor electrically connected between the connection node and the first driving electrode, and wherein during the interval in which the at least one first pixel is driven, the mode control transistor is turned on, and when the driving of the at least one first pixel is completed, the mode control transistor is turned off.

11. The sensing device according to claim 1, wherein the transducer generates ultrasonic waves according to an electrical state of the first driving electrode.

12. The sensing device according to claim 1, wherein the piezoelectric material layer is in a form of a plate, and disposed commonly in an area of the plurality of pixels.

13. The sensing device according to claim 1, wherein the piezoelectric material layer is divided into portions corresponding to sizes of respective areas of the plurality of pixels.

14. The sensing device according to claim 1, wherein the second driving electrode is in a form of a plate, and disposed commonly in an area of the plurality of pixels.

15. The sensing device according to claim 1, wherein the second driving electrode is divided into portions corresponding to sizes of respective areas of the plurality of pixels.

16. A display device comprising:
a display panel;
a sensing panel including a plurality of pixels;
a display driving circuit for driving the display panel; and
a sensing circuit driving and sensing the sensing panel,
wherein each of the plurality of pixels disposed in the sensing panel comprises:
  a transducer including a first driving electrode, a piezoelectric material layer, and a second driving electrode;
  a first transmission transistor and a second transmission transistor electrically connected between a driving line to which a first driving voltage is supplied and the second driving electrode to which a second driving voltage is supplied; and
  a first reception transistor and a second reception transistor electrically connected between a readout line and a power supply line to which a power supply voltage is supplied,
wherein the first transmission transistor is electrically connected between a connection node to which the first transmission transistor and the second transmission transistor are electrically connected and the driving line,
wherein the second transmission transistor is electrically connected between the connection node and the second driving electrode, wherein the first reception transistor is electrically connected between an intermediate node to which the first reception transistor and the second reception transistor are connected and the power supply line, wherein the second reception transistor is controlled by a reception scan signal and electrically connected between the intermediate and the readout line, wherein the first driving voltage and the second driving voltage are DC voltages each having a different level from each other, and wherein during an interval in which at least one first pixel of the plurality of pixels is driven, in the at least one first pixel, the first transmission transistor repeats turn-on and turn-off, and the second transmission transistor repeats turn-on and turn-off opposite to those of the first transmission transistor.

17. The display device according to claim 16, wherein during the interval in which at least one first pixel is driven, a level of a voltage in the first driving electrode of the transducer included in the at least one first pixel swings between the first driving voltage and the second driving voltage.

18. The display device according to claim 16, wherein both the first transmission transistor and the second transmission transistor are n-type transistors or p-type transistors.

19. The display device according to claim 18, wherein a gate node of each of the first transmission transistor and the second transmission transistor is electrically connected to a different scan line from each other.

20. The display device according to claim 16, wherein one of the first transmission transistor and the second transmission transistor is an n-type transistor, and another one of the first transmission transistor and the second transmission transistor is a p-type transistor.

21. The display device according to claim 20, wherein a gate node of each of the first transmission transistor and the second transmission transistor is electrically connected to a same scan line, and a mode control transistor is electrically connected between the connection node to which the first transmission transistor and the second transmission transistor are connected and the first driving electrode.

22. The display device according to claim 21, wherein the mode control transistor is turned on until the first transmission transistor and the second transmission transistor are alternately turned on, and turned off when only one of the first transmission transistor and the second transmission transistor remains turned on.

23. The display device according to claim 16, wherein the display device senses a touch or a fingerprint on the display panel based on sensing data from the sensing panel.

* * * * *